United States Patent
Li et al.

(10) Patent No.: US 12,513,350 B1
(45) Date of Patent: Dec. 30, 2025

(54) DYNAMIC RECOMMENDATION SYSTEM USING REINFORCEMENT LEARNING FOR CONTINUAL LEARNING

(71) Applicant: PAYPAL, INC., San Jose, CA (US)

(72) Inventors: Yiwei Li, San Jose, CA (US); Alessandro Festante, Fremont, CA (US); Angadhjot Hundal, San Jose, CA (US); Karteek Reddy Chada, Dublin, CA (US); Sridevi Nelluri, Fremont, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 18/796,906

(22) Filed: Aug. 7, 2024

(51) Int. Cl.
| | |
|---|---|
| *H04N 21/25* | (2011.01) |
| *G06N 3/092* | (2023.01) |
| *G06Q 10/0639* | (2023.01) |

(52) U.S. Cl.
CPC .......... *H04N 21/251* (2013.01); *G06N 3/092* (2023.01); *G06Q 10/0639* (2013.01)

(58) Field of Classification Search
CPC ... H04N 21/251; G06N 3/092; G06Q 10/0639
See application file for complete search history.

(56) References Cited

U.S. PATENT DOCUMENTS

| | | | | |
|---|---|---|---|---|
| 2022/0366295 | A1* | 11/2022 | Lamba | .......... G06N 20/00 |
| 2024/0020345 | A1* | 1/2024 | Ulanov | .......... G06F 16/9535 |

OTHER PUBLICATIONS

Levine, Sergey, et al. "Offline reinforcement learning: Tutorial, review, and perspectives on open problems." arXiv preprint arXiv:2005.01643 (2020), 43 pp.

* cited by examiner

*Primary Examiner* — Nnenna N Ekpo
(74) *Attorney, Agent, or Firm* — Greenberg Traurig, LLP

(57) ABSTRACT

System and methods for predicting content items using a neural network model and performing reinforcement learning as continual learning for training the neural network model includes obtain a first dataset of user actions of a plurality of users at a plurality of user devices and a second dataset of historical data for the plurality of users, extract a first set of embeddings and a second set of embeddings from the first dataset and the second dataset, output a trained model based on applying the first and second set of embeddings, determine a set of candidate content items by the trained model, determine a prediction value for each respective candidate content item of the set of candidate content items by the trained model, and output one or more content items of the set of candidate content items based on the prediction value determined for each respective first candidate content item.

20 Claims, 10 Drawing Sheets

DYNAMIC RECOMMENDATION SYSTEM USING REINFORCEMENT LEARNING FOR CONTINUAL LEARNING

FIELD

The present disclosure relates to neural network models. More particularly, to a dynamic recommendation system using reinforcement learning for continual learning.

BACKGROUND

A user device can conduct different electronic activities on a networked system including, for example, fulfilling electronic transactions, sending and receiving electronic documents with other devices, offering goods and services of the user to other user devices, and the like. The electronic transactions being performed using the networked system can include electronic transactions between the user device and other devices of the networked system, other user devices, other networked systems, and the like. The electronic activities can include sending and receiving content. Content sent to the user device can be displayed at an interface such as, for example, a website, mobile application, and other user interfaces. A user's activities on the networked system such as, for example, user interactions with content at the user interface can generate data corresponding to the user's behaviors. For example, a user interacting with a selectable tile displayed on the user interface can trigger a sequence of actions, and the data generated at the user device based on the user behavior can then be obtained by the networked system for different purposes such as for data analytics, user behavior inferencing, and identifying suspicious or malicious activity, among other purposes.

BRIEF DESCRIPTION OF THE DRAWINGS

Some embodiments of the disclosure are herein described, by way of example only, with reference to the accompanying drawings. With specific reference now to the drawings in detail, it is stressed that the embodiments shown are by way of example and for purposes of illustrative discussion of embodiments of the disclosure. In this regard, the description taken with the drawings makes apparent to those skilled in the art how embodiments of the disclosure may be practiced.

DETAILED DESCRIPTION

Figure 1:
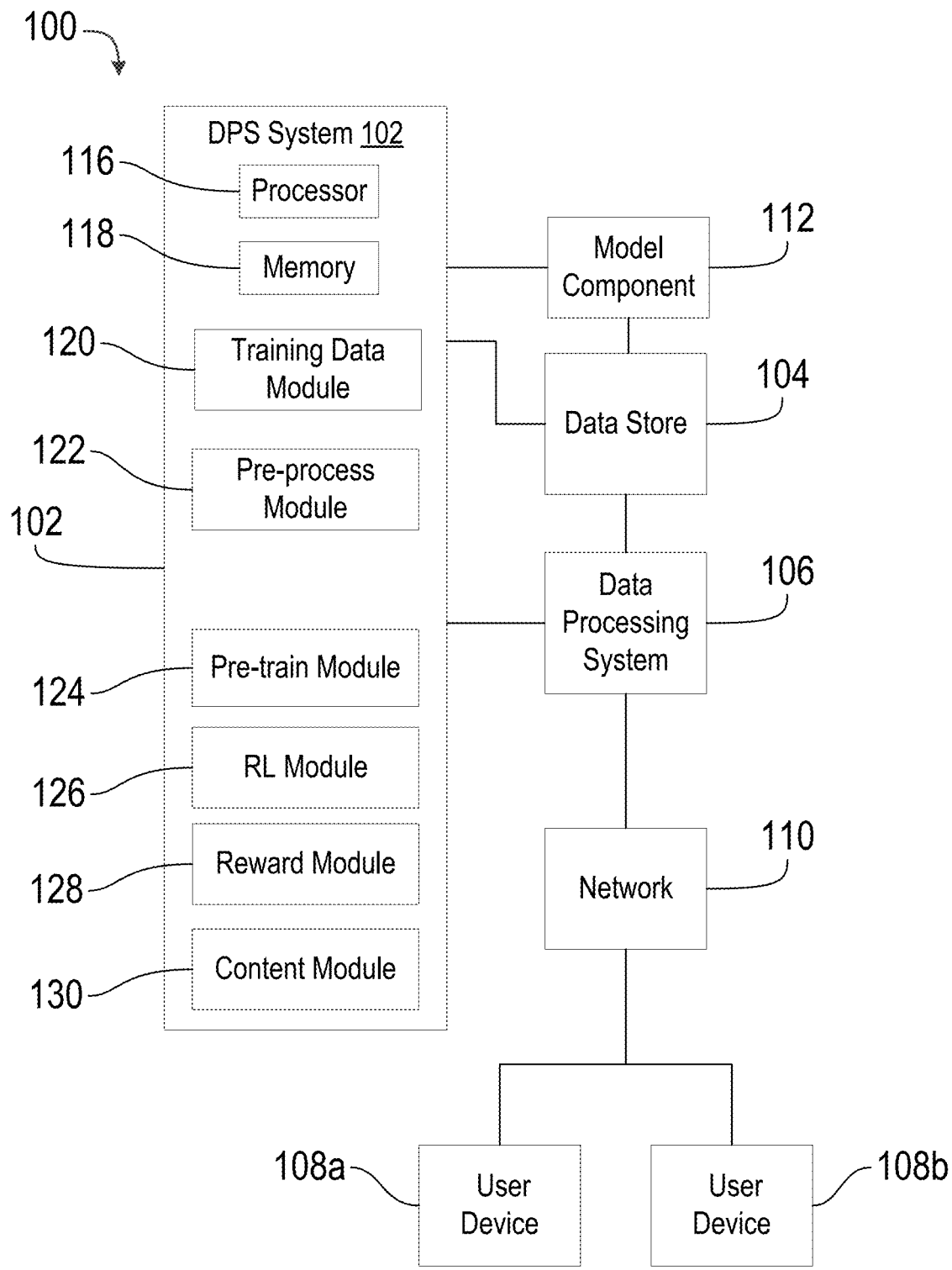
FIG. 1 is a block diagram of a network, according to some embodiments.

Various embodiments of the present disclosure relate to systems, devices, networks, and methods for training a machine learning model using reinforcement learning for continual learning. A recommendation system of a network, for example, can train machine learning models using reinforcement learning for continual learning. The machine learning models trained using reinforcement learning for continual learning can be applied to input data obtained by the network to determine the content recommendations based on the input data. That is, the machine learning models may be utilized by the recommendation system for providing real-time, context aware content recommendations based on the input data. The recommendation system applies the machine learning models to the input data and determines the content recommendations in real-time by applying one or more machine learning techniques and/or algorithms to input data and determining content recommendations as predictions. The content recommendations can be sent to a user device associated with the input data by the recommendation system. The "content recommendations" can also be referred to as "content items," "content item recommendations," "objects," or "object items" in the present disclosure.

Performing continual learning on the machine learning models can include using reinforcement learning. Reinforcement learning includes finetuning machine learning models using data obtained by the recommendation system of the network from a feedback loop. The data in the feedback loop can be, for example, from user interactions with content recommendations provided to the user device by the recommendation system. After the recommendation system sends a content recommendation to a user device at the network, the recommendation system can receive data from the feedback loop to make determinations including, for example, whether the user behavior data from the user device is indicative of the user interacting with the content recommendation. Based on the feedback data, the recommendation system can finetune the machine learning models so as to enable the machine learning models to make improved and more accurate content recommendation candidates predictions in response to input data subsequently obtained from the user device. In this regard, a content recommendation determined by the machine learning model before the finetuning can be the same, similar, or different from the content recommendation determined by the machine learning model after the finetuning. In some embodiments, the input data can further include the feedback data, and the machine learning model trained on the feedback data as reinforcement learning can be applied by the recommendation system to the input data for determining subsequent or additional content recommendations to provide to the user device. These content recommendations can be the same, similar, or different from the content recommendations previously determined by the machine learning model and provided to the user device.

Performing reinforcement learning on the machine learning models as continual learning allows the recommendation system to provide real-time, context aware content recommendations utilizing the machine learning models that goes beyond optimizing user click through rates and can instead optimize any determined metric over time. For example, the reinforcement learning of the machine learning models allows for optimizing the content recommendations based on the input data that meets the business objectives of the entity.

Content recommendations determined by the machine learning model can be based on one or more rules. That is, the content recommendation sent to the user device can be a content recommendation candidate of one or more content recommendation candidates determined by the machine learning model and selected by the networked system based on the one or more rules. The content recommendations can also be based on one or more parameters. The parameters can be determined by a user such as, for example, a user associated with an entity of the networked system, the networked system including the recommendation system. For example, the parameters can be input by a data scientist associated with the entity. The parameters can be based on, for example, a business objective of the entity.

The input data can include, but is not limited to, clickstream data, behavior data, web browser data, transactional data, interaction data, identity data, feedback data, sentiment data, account data, personal data, catalog data, electronic documents, historical data, other data types, or any combination thereof. The input data applied to the machine learning model by the recommendation system can include, but is not limited to, streaming data and batch data. As used herein, the term "streaming data" refers to data that is generated by one or more other sources and obtained by a network or a network device. For example, streaming data can be obtained by the network associated with the recommendation system from a user device. In another example, streaming data can be obtained by the network from a plurality of user devices. As used herein, the term "batch data" refers to locally stored data. For example, batch data associated with the user device can be obtained from a data store associated with the network. In another example, batch data can be obtained from a data store in the network based on the user data associated with the streaming data. The recommendation system can, based on applying a machine learning model to the streaming data and the batch data, determine personalized content recommendations to the user device in real-time that aligns with user's preferences and behaviors as determined from the input data and is not based on a static dataset.

The input data can further include other types of data including randomized data, experiment data, or both. Randomized data can be obtained by the recommendation system using a random exploration lane. The recommendation system can perform reinforcement learning of the machine learning models utilizing input data including the randomized data so as to promote data exploration beyond static datasets. The randomized data can also enable overcoming limits of cold start problems for new content recommendations. In addition, the randomized data provides a source of unbiased data, which improves model performance when deployed into production by the recommendation system and at the network. In some embodiments, the reinforcement learning can be offline reinforcement learning. In some embodiments, the input data can include the streaming data, batch data, and randomized data.

Utilizing the random exploration lane also mitigates the limitations of using static datasets by allowing for collecting data beyond the static dataset, which can then be used to build a replay buffer. The exploration provided by the random exploration lane also improves model performance to counterfactual queries, e.g., the ability to answer "what if" scenarios to improve beyond the training dataset, which can be challenging when utilizing static datasets due to the shift from independent and identically distributed (IID) assumptions. In addition, the model improves upon responses to counterfactual queries by being configured to learn separate representations for each feature type to improve the ability of the machine learning models to generalize to counterfactuals. As used herein, the term "counterfactuals" refers to conditional sentences discussing what would have been true under different circumstances (e.g., if, then).

The experiment data can correspond to data output by one or more other models based on applying the one or more models to the input data. The experiment data enables the recommendation system to determine limitations of the machine learning models such as, for example, if the reinforcement learning of the machine learning models does not produce the anticipated outcomes when applied to the input dataset. For example, content recommendation candidates that are determined by the machine learning models based on the input data that depart from candidates determined based on the experiment data may be indicative of failure of the reinforcement learning performed on a respective machine learning model. In some embodiments, the input data can include the streaming data, batch data, and experiment data. In other embodiments, the input data can include the streaming data, batch data, experiment data, and randomized data.

The recommendation system can produce one or more machine learning models as output based on the input data. In some embodiments, the recommendation system can provide a first model and a second model. The first model can be based on performing reinforcement learning on a previous model. As used herein, the term "previous model" refers to a machine learning model trained on a previous iteration training dataset so at least one of the weights and biases of the model is different from a subsequent model trained on a new or refined training dataset. The second model can be a pre-trained model produced from scratch. As used herein, the term "pre-trained model" refers to a machine learning model trained on a dataset to include initial weights and biases and can be fine-tuned for a specific task.

The recommendation system can generate one or more machine learning models and can output a machine learning model of the one or more machine learning models for predicting content recommendations based on performing reward testing on the machine learning models. In some embodiments, the machine learning model output by the recommendation system can be based on the reward testing and a reward threshold. In some embodiments, the machine learning model output by the recommendation system can be at least one of a first model, second model, a previous model, or any combination thereof, determined by the recommendation system based on the reward testing and the reward threshold. For example, the recommendation system can output one of the first model or the second model for providing the content recommendations to user devices based on determining which of the first model and the second model has a highest reward function.

In addition, for instances when the recommendation system determines the content recommendations predicted by the first model, second model, or both the first and second model depart from the content recommendations determined based on, for example, the experiment data, the recommendation system can output the previous model for determining the content recommendations to user devices in response to input data based on the reward testing and the reward threshold. For example, the recommendation system can output the previous model for providing the content recommendations to user devices instead of the first model and the second model based on the previous model having the highest reward function. In some embodiments, the previous model can be the first model prior to performing the reinforcement learning. In some embodiments, the reward threshold can be input by a user into the recommendation system. For example, a data scientist associated with an entity of the network can input metrics corresponding to the reward threshold into the recommendation system. In some embodiments, the reward testing can be A/B testing. As used herein, the term "A/B testing" refers to a method of comparing a performance of two or more versions of an asset such as, for example, a machine learning model, based on one or more metrics.

The recommendation system includes one or more improvements for performing continual learning of machine learning models utilizing reinforcement learning and for deploying a machine learning model capable of providing content recommendations based on input data. The improvements of the recommendation system can include utilizing reinforcement learning to refine a previous model to produce a trained model as output capable of providing content recommendations as output based on input data that is both relevant and able to change in real time based on recent user behavior data. The improvements of the recommendation system also include the machine learning model being able to optimize a given metric over time, on a user level that can go beyond the usual click through rate. The improvements of the recommendation system also include being able to overcome limitations associated with traditional offline reinforcement learning algorithms that train models on static datasets to enable deploying the trained machine learning models into recommendation systems such as, for example, recommendation systems in other networks using the existing infrastructure of the recommender system. In addition, whereas conventional offline reinforcement learning prevents or limits models from exploring beyond the scope of static datasets, the improvements of the recommendation system enables the trained models to explore beyond the training dataset scope to discover high-reward regions that may not be represented in the training data.

The embodiments of the present disclosure can also mitigate different distributions representative of large distributional shifts that result from using static datasets when the model encounters new states. The different distributions can be to optimize expected returns from the models. By utilizing a training module that performs continual learning of previous models using reinforcement learning, any large distributional shifts may be mitigated by retraining the models at regular, periodic intervals, thereby further mitigating the limitations associated with utilizing static datasets. In addition, to mitigate limitations from the different distributions that may occur as a result of the reinforcement learning of the previous model to produce the first model failing to converge, the networked system can include another model such as, for example, the second model, that can replace the first model. That is, the recommendation system can perform the reward testing on at least the model trained using reinforcement learning and the other model, and the recommendation system may determine, based on the reward testing, that the model trained using reinforcement learning is outputting data representative of large distributional shifts from the previous model. Accordingly, the recommendation system may provide the other model to provide the content recommendations, thereby reducing downtime of the recommendation system and/or the network due to model failure. For example, in response to the model trained from the previous model outputting data having large distributional shifts, the recommendation system outputs the model trained from scratch to provide the content recommendations to users.

Among those benefits and improvements that have been disclosed, other objects and advantages of this disclosure will become apparent from the following description taken in conjunction with the accompanying figures. Detailed embodiments of the present disclosure are disclosed herein; however, it is to be understood that the disclosed embodiments are merely illustrative of the disclosure that may be embodied in various forms. In addition, each of the examples given regarding the various embodiments of the disclosure which are intended to be illustrative, and not restrictive.

FIG. 1 is a block diagram of a system 100, according to some embodiments.

The system 100 can include a recommendation system 102, a datastore 104, a data processing system 106, a plurality of user devices 108 (two such user devices 108a, 108b are shown), a network 110, and a model component 112. The user devices 108 can be in electronic communication with data processing system 106 over network 110 to perform, for example, electronic transactions in the system 100. In some embodiments, the user devices 108 may be associated with other entities utilizing system 100 to perform the electronic transactions. The recommendation system 102, datastore 104, data processing system 106, or any combination thereof, can also be in electronic communication with each other via the network 114, other networks, or any combination thereof.

It is to be appreciated by those having ordinary skill in the art that although not shown in the figures, the system 100 may include one or more other devices in electrical connection with the system 100 via network 110 for performing electronic transactions with one or more other computing devices of the system 100 such as, for example, the user devices 108. It is also to be appreciated by those having ordinary skill in the art that the number of computing devices that can be connected to system 100 and performing electronic transactions using system 100 is not intended to be limiting and that the system 100 may be scalable so as to include any number of computing devices performing any number of electronic transactions on the system 100. For example, millions, tens of millions, hundreds of millions, or more respective devices can be performing electronic transactions in system 100.

The recommendation system 102 includes a processor 116 and a non-transitory computer readable memory 118 that contains instructions that, when executed by the processor 116, causes the recommendation system 102 to perform one or more steps, processes, methods, operations, etc. described herein with respect to the recommendation system 102. The recommendation system 102 may include one or more functional modules embodied in the memory. The functional modules may include a training data module 120, pre-process module 122, pre-train module 124, reinforcement learning (RL) module 126, reward module 128, and content module 130.

The training data module 120 can obtain data as input for training the machine learning models. The training data can include streaming data, batch data, or combinations thereof. The streaming data can be obtained from a computing device such as, for example, user device 108. The batch data can be obtained from a data store such as, for example, datastore 104. In some embodiments, the batch data can be stored in recommendation system 102 such as, for example, memory 118. In other embodiments, the batch data can be stored in a data store that is external to recommendation system 102. In some embodiments, the batch data can be stored in a data store that is external to system 100 and obtained using network 110.

The pre-process module 122 can include a query engine to store and analyze data. The data can include, but is not limited to, user interaction data, user account data, historical data, feedback data, metadata, training data, other model data, or any combination thereof, among other data. In some embodiments, the data can include both structured and unstructured data. For example, the training data can be initially trained using structured data and further trained based on unstructured data obtained during operation of recommendation system 102 and/or system 100. The pre-process module 122 can obtain data from one or more sources and perform one or more pre-processing operations using the data to derive insights from the data. In some embodiments, the pre-process module 122 can perform at least one of identify features, extract features, filter out unrelated data as noise, transform features into feature embeddings, or any combination thereof, among other operations. For example, the pre-process module 122 can receive data from one or more lanes (e.g., data traffic lanes) and transform identified features into feature embeddings that may then be provided to the one or more other functional modules to enable training the models using reinforcement learning and to enable the models to provide the content recommendations as output predictions.

The training data obtained by the recommendation system 102 can be utilized to train one or more models. In some embodiments, the training data including at least one of the streaming data and batch data can be utilized to train a respective model of the one or more models. In other embodiments, the training data including at least one of the streaming data and batch data can be obtained by the pre-process module 122, the relevant features (e.g., valuable features) in the training data can be transformed into the feature embeddings, and one or more of the feature embeddings can be utilized to train a respective model of the one or more models.

The pre-train module 124 can generate pre-trained models from scratch based on data. In some embodiments, the pre-train module 124 can generate a pre-trained model and fine-tune the pre-trained model for a specific task based on corresponding metrics. A user associated with an entity of the system 100 can provide the metrics as input to the recommendation system 102, and the pre-train module 124 can fine-tune the pre-trained model based on the metrics. In some embodiments, the metrics can be based on a desired objective of the entity. For example, the metrics input into the recommendation system 102 by the user can correspond to values representative of business objective of the entity.

The RL module 126 can train models by utilizing reinforcement learning as continual learning to fine-tune the models using training data to improve the content recommendation predictions output by the model based on defined metrics. The training data can include, but is not limited to, an initial training data, previous training data, streaming data, batch data, one or more portions thereof, or any combination thereof. For example, the training data used to train an initial model of the recommendation system 102 can include the initial training data. In another example, the training data used to train a previous model of the recommendation system 102 can include feedback data obtained from the streaming data. In some embodiments, the model being trained by the RL module 126 can be a previous iteration model trained on a previous training data. For example, the previous model can be trained using the feature embeddings extracted by the pre-process module 122 from the previous training data. In some embodiments, the model trained by the RL module 126 can be a previous iteration model trained using a corresponding previous training data.

The initial training data can include, for example, at least one of supervised data, unsupervised data, or both that can be used to initially train weights and biases of a model of the recommendation system 102 based on a defined metric. The previous training data can be what was used to train the previous model and can include, for example, the initial data, streaming data, batch data, previous iterations of training data, other data, or any combinations thereof. The streaming data can be obtained from the user devices 108 and generated based on activities of the users of the user devices 108 in the network 110 and system 100. The streaming data can include feedback data generated in response to a respective user's interactions with content recommendations determined by the model and sent to the respective user device 108. The batch data can include, for example, user profile data, user account data, historical streaming data, user sentiment data, user behavior data, inferencing data, and the like. In some embodiments, the training data can further include randomized data obtained through a randomized lane of data traffic at the recommendation system 102. In some embodiments, sample trajectories can be determined based on the training data. In other embodiments, the sample trajectories can be determined based on the feedback data. That is, the feedback data corresponding to user behavior generated in response to content recommendations that the model determined can be utilized to extract sample trajectories corresponding to state values. As used herein, the term "sample trajectory" refers to a sequence of data and related features representative of a status of an environment at a given point in time or over a given time period. For example, each sample trajectory may correspond to a state value representative of a browsing history data from a user device at a time period when a certain webpage was reached at the user device.

The RL module 126 can train the models by fine-tuning the models using reinforcement learning as continual learning based on training data. The recommendation system 102 includes a feedback loop for obtaining feedback data generated at the user devices 108 from user behaviors (e.g., from streaming data) including user interactions with content recommendations determined by a respective model being trained. The RL module 126 can also train the models based on one or more metrics defined by a user associated with an entity of the recommendation system 102 and/or system 100. The feedback loop thereby enables improved model training by the RL module 126 of recommendation system 102 by training the model to learn the value of the policy being carried out by the algorithms that can be applied by the model to the input data and by allowing for data exploration by the models. By contrast, off-policy model training using other methods and/or techniques updates its algorithms by training the models using static datasets so that the model estimates what is believed to yield the highest expected return (total discounted future reward), which limits the ability for data exploration. Moreover, to enable fine-tuning the models using reinforcement learning for continual learning by the RL module 126, the previous training data can be incrementally updated with feedback data so that the training data does not need to be regathered to train the model such as, for example, for on-policy models. This also enables small changes to be made to policies such as, for example, based on the business objectives of the entity associated with the recommendation system 102, without necessitating having to retrain a model using a new training dataset gathered based on the updated policy. Instead, the feedback loop allows for making these small changes to a given policy of the model and the RL module 126 can then fine-tune the model using reinforcement learning for continual learning based on feedback data.

In some embodiments, the models provided by the recommendation system 102 and utilized for providing the content recommendations can be deep Q-network models. The RL module 126 can fine-tune the model using reinforcement learning for continual learning by training the algorithms of the model based on input data obtained from the feedback loop and observing properties of the environment based on the training. In some embodiments, the RL module 126 can fine-tune the model using reinforcement learning for continual learning by estimating Q-functions for sample trajectories determined based on the feedback data. The Q-functions can also be referred to herein as Q-value functions. As used herein, the term "Q-function" refers to a quality measure estimating an expected reward that may be obtained for taking a specific action in a given state based on a policy.

The input data applied to the model being trained can include training data. In some embodiments, the input data can include the feedback data. In some embodiments, the training data can include the feedback data. The feedback data can be determined from the streaming data. The sample trajectories can be determined from the input data. In some embodiments, the sample trajectories can be determined from the feedback data. In addition, the sample trajectories can correspond to state values and the RL module 126 can train the model by applying the state values. In some embodiments, the pre-process module 122 can identify the feedback data in the streaming data. In some embodiments, the pre-process module 122 can transform the feedback data into the sample trajectories. For example, the pre-process module can apply one or more models to the feedback data and transform the data to the state values representative of the sample trajectories. In other embodiments, the model being trained by RL module 126 can determine the state values representative of the sample trajectories based on applying one or more other algorithms to the feedback data.

Fine-tuning the model using reinforcement learning includes the model being trained applying one or more algorithms to the state values and determining a corresponding Q-function based on the estimated reward that can be obtained for a respective Q-value. The respective Q-value can also be determined by the model based on a corresponding policy being applied by the model by the recommendation system 102. As used herein, the term "policy" refers to a probabilistic mapping from states to actions.

According to some embodiments, the fine-tuning of the model can include training one or more algorithms of the model in an environment that allows an agent to learn a Q-function by navigating a sequence of states and determining respective Q-values as output based on observing properties of the environment in response to the agent's actions. In some embodiments, the Q-function may be an optimal Q-function based on, for example, a model policy. In some embodiments, the observed properties correspond to Markov properties. In some embodiments, the optimal Q-function is learned using a Markov decision process based on applying a Bellman equation. In some embodiments, the Markov decision process is represented by graph data corresponding to actions taken in an environment in response to state values, and the observed properties of the environment or changes thereto based on information resulting from the state transitions between the input states and the respective actions. As used herein, the term "agent" refers to data corresponding to instructions that is configured to plan and execute an action or series of actions in pursuit of a goal or objective. The agent can identify changes in the environment and adapted to the changes by, for example, determining a different action or series of actions from the initial action or series of actions in response to the change in the environment. In addition, based on a policy of the model, the action or series of actions determined by the agent can be configured to maximize an expected return of a state-action pair.

The models for providing content recommendations as output predictions based on input data can be a neural network model that processes data input into the model based on one or more algorithms applied using one or more layers. The one or more layers can include an input layer, an output layer, and one or more hidden layers therebetween. In some embodiments, the one or more layers can further include at least one of convolutional layers, fully-connected layers, function layers, or any combination thereof, among other layers. In some embodiments, the models provided by the recommendation system 102 for providing the content recommendations can be deep Q-network models.

Fine-tuning a previous model to provide the trained model can include updating one or more weights stored at one or more layers of the model. In some embodiments, fine-tuning the previous model to provide the trained model can include updating weights at an output layer of the model using backpropagation so as to minimize losses of the model. In some embodiments, fine-tuning the model can include determining a respective Q-value output for each state value input into the model, updating one or more of the weights at the output layer of the model based on the rewards and losses determined for each respective Q-value output. In some embodiments, fine-tuning the model can include repeating the determining of the respective Q-value outputs and the updating of the one or more weights at the output layer of the model over one or more cycles until an optimal Q-function can be determined.

Fine-tuning the previous model can include calculating losses by one or more algorithms applied by the model. In some embodiments, the losses can be calculated by determining a respective Q-value output for each sample trajectory, calculating a difference between the output Q-values and target Q-values, and updating the weights at the output layer to minimize the losses. In some embodiments, the losses can be determined using a Bellman equation.

The model training can include the recommendation system 102 determining one or more models. The one or more models can include a pre-trained model, fine-tuned RL model, previous model, or any combination thereof, and which are determined by one or more of the functional modules of the recommendation system 102. The reward module 128 can perform reward testing on the one or more models and the recommendation system 102 can output the model having the highest reward score. That is, the recommendation system 102 can determine which model of the one or more models generated by one or more of the functional modules of recommendation system 102 to implement into production for predicting content recommendations in response to input data obtained from user devices 108. For example, based on the reward testing, the recommendation system 102 can implement the fine-tuned off-policy model trained using reinforcement learning into production. In another example, based on the reward testing, the recommendation system 102 can implement the model trained from scratch into production. In yet another example, based on the reward testing, the recommendation system 102 can implement or maintain the previous model trained using the previous training dataset into production. The reward testing performed by the reward module 128 can be A/B testing, according to some embodiments.

The content module 130 can obtain the model provided as output from the reward testing performed by reward module 128 and apply the model into the production environment. In this regard, the content module 130 can apply the model to input data and the model can provide content recommendations predictions based on the input data and based on the one or more metrics of the model. In some embodiments, the input data includes streaming data and batch data. In other embodiments, the input data can further include feedback data. In some embodiments, the streaming data can include the feedback data. In this regard, the recommendation system 102 can obtain data from a plurality of user devices 108, and the model can be applied to the data from a user device 108 of the plurality of user devices 108 and the model can output at least one content recommendation prediction. In some embodiments, the recommendation system 102 can obtain data from the plurality of user devices 108, and the model can be applied to the data of at least one user device 108 of the plurality of user devices 108 and the model can output the at least one content recommendation prediction for each of the at least one user device 108.

The present disclosure refers to content recommendations, interactions, accounts, users, transactions, behaviors, states, actions, web browsing history, and other types of electronic activity in the system 100. Such states, for example, can include a set of sample trajectories common to a user device 108 of system 100. The user device 108 can be associated with a user including, for example, an online merchant, service provider, a particular network, a particular electronic activity processor, and other like users, that utilizes system 100 to perform electronic transactions in system 100 with other computing devices.

Although the present disclosure refers to the electronic transactions as context for the novel methods and systems, it should be understood that such methods and systems may be applied to or in the context of a wide variety of computing actions, some of which may not be considered electronic transactions. For example, such computing actions can be based on the user device 108 interacting with other network devices other than network 110 of system 100.

Various embodiments herein can employ artificial-intelligence, neural network models, deep learning neural network models, deep q-learning neural network models, and/or machine learning systems and techniques to facilitate training the models from scratch, training the models using reinforcement learning for continual learning, determining content recommendations as output predictions based on applying the input data to the models, other processes, or any combination thereof. Although the one or more embodiments are described in the present disclosure in the context of content recommendations, it is to be appreciated that the various embodiments can be utilized in a networked system such as, for example, system 100 for any of a plurality of purposes including, but not limited to, content recommendations, managing threats including identifying suspicious or fraudulent transactions, learning user behavior, context-based scenarios, preferences, etc. in order to facilitate the system 100 taking automated action with high degrees of confidence for the computing devices performing transactions on the network 110. Utility-based analysis can be utilized to factor benefit of taking an action against cost of taking an incorrect action. Probabilistic or statistical-based analyses can be employed in connection with the foregoing and/or the following.

It is noted that systems and/or associated controllers, servers, or M.L. components 112 herein can comprise artificial intelligence component(s) which can employ an artificial intelligence (AI) model, neural network or a neural network model, or M.L. or a M.L. model, that can learn to perform the above or below described functions (e.g., via training data and/or feedback data).

In some embodiments, the system 100 and/or the recommendation system 102 can include an M.L. component 112 including an A.I. and/or M.L. model that can be trained (e.g., via supervised and/or unsupervised techniques) to perform one or more of the above or below-described functions using training data including various context conditions that correspond to various management operations. In one example, an A.I. and/or M.L. model can further learn (e.g., via supervised and/or unsupervised techniques) to perform the above or below-described functions using training data including feedback data, where such feedback data can be collected and/or stored (e.g., in memory 118 or datastore 104) by an M.L. component 112. In this example, such feedback data can include the various instructions described above/below that can be input, for instance, to a system herein, over time in response to observed/stored context-based information.

A.I./M.L. components herein can initiate an operation(s) associated with the one or more functional components 120, 122, 124, 126, 128, 130 of the recommendation system 102 based on a defined level of confidence determined using information (e.g., feedback data). For example, based on learning to perform such functions described above using feedback data, performance information, and/or past performance information herein, an M.L. component 112 herein can initiate an operation associated with providing content recommendations as output predictions based on input data applied to the model including streaming data and batch data. In another example, based on learning to perform such functions described above using feedback data, an M.L. component 112 herein can train a model from scratch, train a model using reinforcement learning for continual learning, or both.

In an embodiment, the M.L. component 112 can perform a utility-based analysis that factors cost of initiating the above-described operations versus benefit. In this embodiment, an artificial intelligence component can use one or more additional context conditions to determine an appropriate distance threshold or context information, or to determine an update for a tuning model.

To facilitate the above-described functions, an M.L. component 112 herein can perform classifications, correlations, inferences, and/or expressions associated with principles of artificial intelligence. For instance, an M.L. component 112 can employ an automatic classification system and/or an automatic classification. In one example, the M.L. component 112 can employ a probabilistic and/or statistical-based analysis (e.g., factoring into the analysis utilities and costs) to learn and/or generate inferences. The M.L. component 112 can employ any suitable machine-learning based techniques, statistical-based techniques and/or probabilistic-based techniques. For example, the M.L. component 112 can employ expert systems, fuzzy logic, support vector machines (SVMs), Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, and/or the like. In another example, the M.L. component 112 can perform a set of machine-learning computations. For instance, the M.L. component 112 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations.

In some embodiments, the M.L. component 112 can utilize one or more clustering techniques including, but not limited to, density-based clustering, distribution-based clustering, centroid-based clustering, hierarchical based clustering, or any combinations thereof. In addition, the one or more models can apply one or more clustering algorithms including, but not limited to, k-means clustering algorithms, density-based clustering algorithms, Gaussian mixture model algorithms, balanced iterative reducing and clustering using hierarchies (BIRCH) algorithms, propagation clustering algorithms, mean-shift clustering algorithms, order point clustering, agglomerative hierarchy clustering algorithms, other algorithms, or any combinations thereof. For example, the model component 112 can apply the one or more centroid-based clustering models to determine clusters using k-means clustering algorithms.

The non-transitory computer readable memory 118 can include one or more datasets that can be obtained by the one or more functional modules 120, 122, 124, 126, 128, 130 of the recommendation system 102 for performing the operations including model training using reinforcement learning, model training from scratch, and applying the model to determine the content recommendations as output predictions, among other operations. In some embodiments, the datastore 104 can include therein one or more datasets that can be obtained by the one or more functional modules of the recommendation system 102 for performing the threat managements between the layers of the open transaction network.

In some embodiments, the data stored in datastore 104 can include, but is not limited to, profile data, account data, personal data, location data, catalog data, learned behavior data, attitudinal data, interaction data, clickstream data, feedback data, historical data, API traffic log data, reference data, neural network model data, randomized data, or any combinations thereof, for at least one of the functional modules 120, 122, 124, 126, 128, 130.

In some embodiments, the data stored in datastore 104 can include, but is not limited to, graph data, text data, image data, numerical data, feature embeddings data, encryption data, tokenization data, or any combinations thereof, for at least one of the functional modules 120, 122, 124, 126, 128, 130.

In some embodiments, the data stored in datastore 104 can include, but is not limited to, attribute data, feature data, metrics data, or any combinations thereof, for at least one of the functional modules 120, 122, 124, 126, 128, 130.

In some embodiments, the data stored in datastore 104 can include, but is not limited to, transaction record data, timestamp data, value data, source account data, target account data, or any combinations thereof, for at least one of the functional modules 120, 122, 124, 126, 128, 130.

In some embodiments, the data stored in datastore 104 can include, but is not limited to, model data, graphs, matrices, cluster sequences, chain matrices, algorithms, or any combinations thereof, for at least one of the functional modules 120, 122, 124, 126, 128, 130.

It is to be appreciated that the data corresponding to instructions and for enabling the recommendation system 102, and the one or more functional modules therein, to perform the content recommendation predictions and the model training can be stored in datastore 104, memory 118, or both. It is also to be appreciated that the datastore 104 and/or the memory 118 can further include therein other data to enable the recommendation system 102 to perform the one or more operations in accordance with the present disclosure.

Users of system 100 can perform one or more operations including initiating electronic transactions on user devices 108 through data processing system 106. In some embodiments, the user can initiate electronic transactions on user device 108 using a call sequence sent from the user device 108 using data processing system 106. The electronic transactions can be between the user device 108 another device in system 100 including, but not limited to, a device of the entity, another user device 108 performing electronic transactions in system 100 using the data processing system 106, and the like. Accordingly, the data processing system 106 can receive from user devices 108 instructions including for initiating electronic transactions, accepting electronic transactions, completing electronic transactions, canceling electronic transactions, reviewing electronic transactions, etc., and the data processing system 106 can respond by performing or facilitating the requested user action.

The data processing system 106 can be associated with a particular electronic user interface and/or platform through which a user performs the electronic transactions. The electronic user interface can be embodied in a website, mobile application, etc. Accordingly, the data processing system 106 may be associated with or wholly or partially embodied in one or more servers, which server(s) may host the interface, and through which the user device 108 may access the user interface. In some embodiments, recommendation system 102 sending item recommendations to user device 108 may include the data processing system 106 displaying the recommendations to the user device 108 using the user interface. In some embodiments, recommendation system 102 obtaining feedback data from user device 108 may include the data processing system 106 receiving user's input(s) corresponding to the user's interactions with the recommendations at the user interface of user device 108.

Each user computing device 108 in electronic communication with data processing system 106 may be associated with a respective user account. That is, user computing device 108a may be associated with a first user account, and user computing device 108b may be associated with a second user account. Where user computing devices 108a, 108b are discussed herein, it may be assumed that different devices are associated with different user accounts for convenience of description, though of course a single user account may be accessed from multiple devices in practical use.

Figure 2:
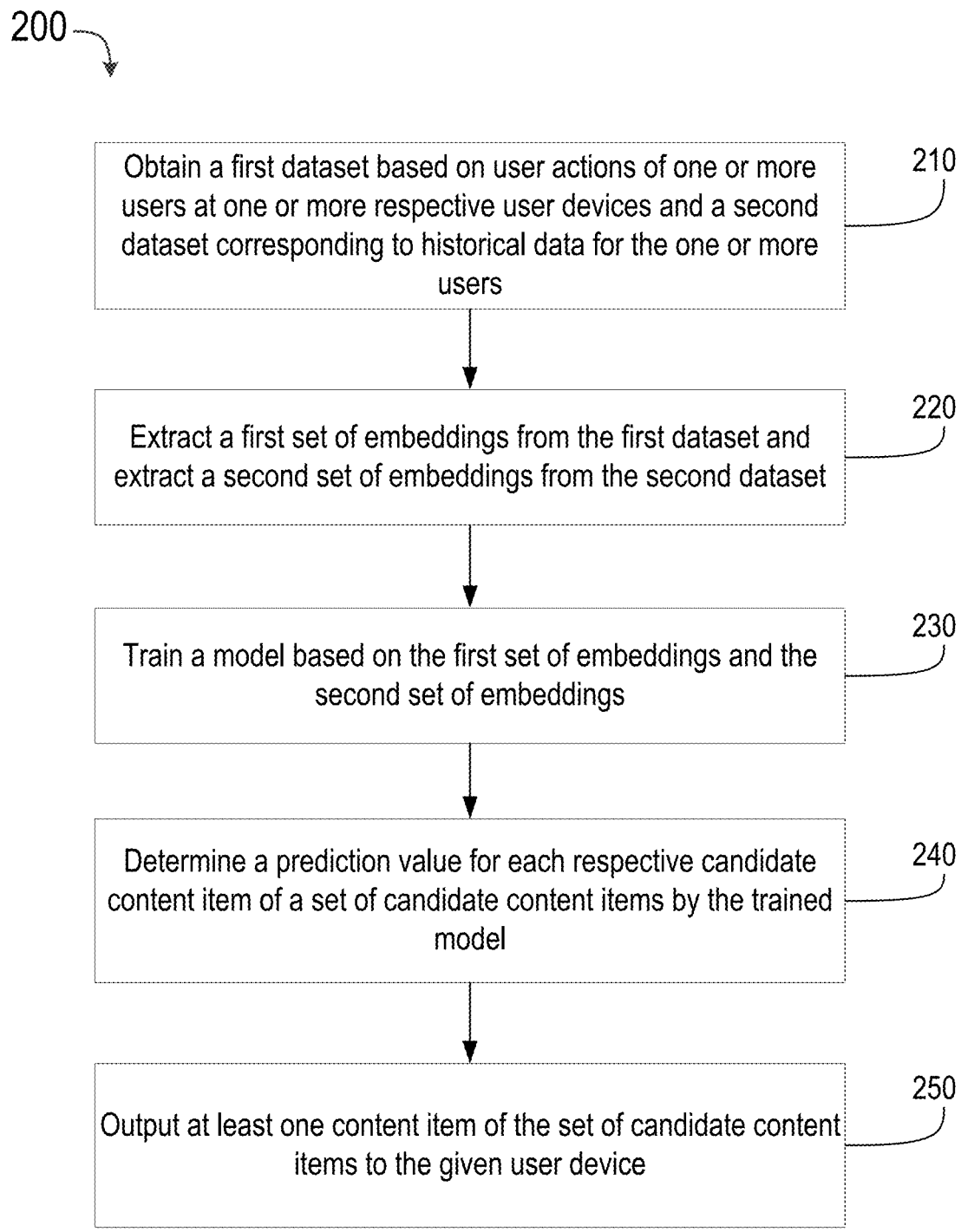
FIG. 2 is a flow diagram of an example method of providing content recommendations, according to some embodiments.

FIG. 2 is a flow diagram of an example method 200 of providing content recommendations, according to some embodiments. The method 200, or one or more portions thereof, can be performed by the functional modules in recommendation system 102 in conjunction with datastore 104, data processing system 106, network 110, or any combination thereof, and thus may be computer implemented.

Figure 3:
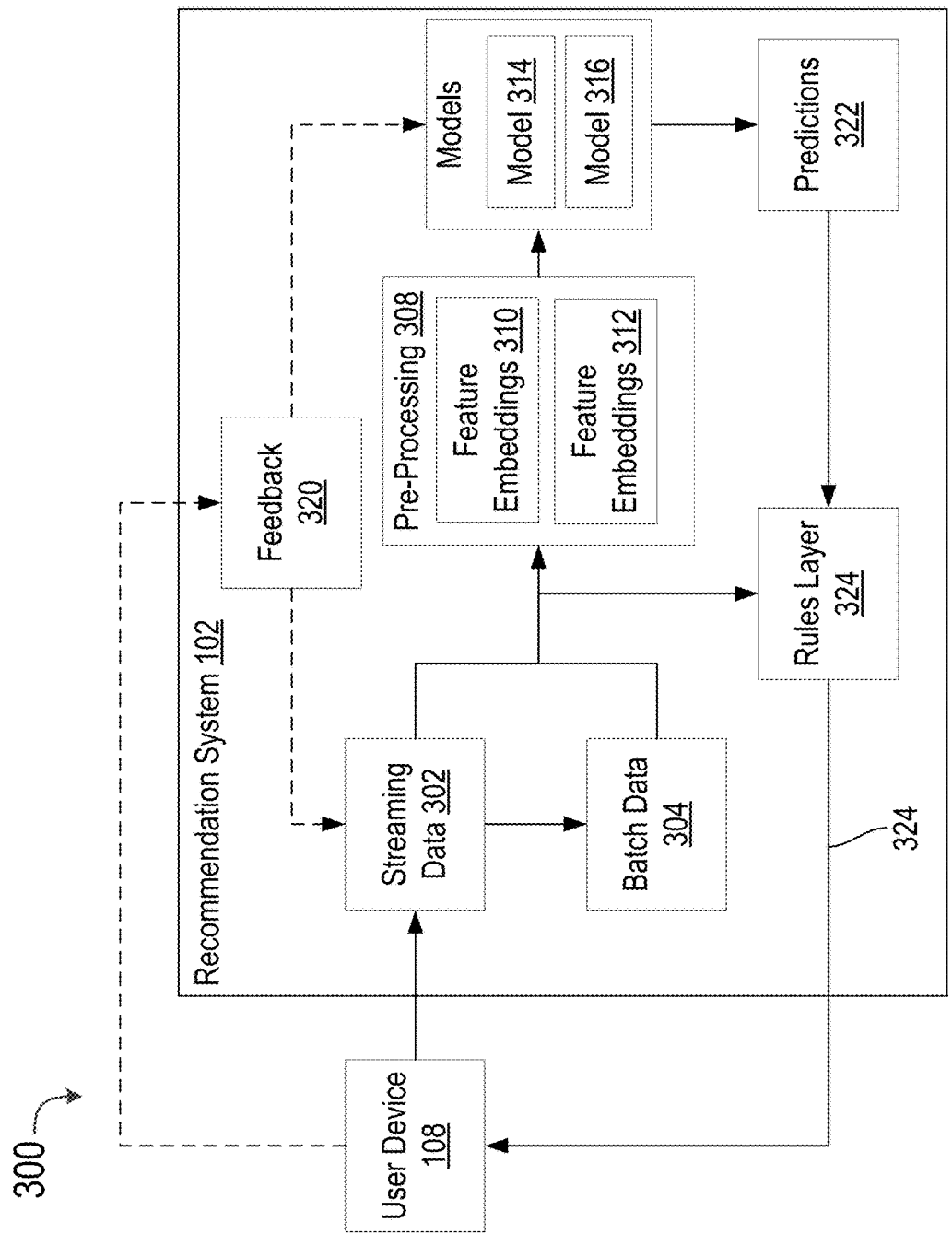
FIG. 3 is a block diagram of a system, according to some embodiments.

FIG. 3 is a block diagram of a system 300, according to some embodiments. The system 300 can perform one or more methods including method 200, or portions thereof, according to some embodiments. The method 200 will be described in conjunction with system 300. In some embodiments, the system 100 can include the system 300 embodied by one or more of the functional modules at recommendation system 102 in FIG. 1.

At 210, the method includes obtaining a first dataset corresponding to user actions of a plurality of users at a plurality of user devices and a second dataset corresponding to historical data for the plurality of users. The plurality of users can be users performing electronic transactions on a networked system using a respective user device of the plurality of user devices. The first dataset can include user sequences representative of the user actions of the plurality of users in response to content items provided to the plurality of user devices by a model during a first time period. In some embodiments, first dataset can include user sequences representative of the user actions of the plurality of users in response to content items provided to the plurality of user devices by the previous model.

The second dataset can correspond to user actions of the plurality of users at respective user devices of the plurality of users during a second time period. In some embodiments, the first dataset and the second dataset can correspond to user actions for at least one user of the plurality of users of a networked system. In other embodiments, the first dataset and the second dataset can correspond to user actions for one or more users of the plurality of users of a networked system. In some embodiments, the second time period can occur before the first time period. In some embodiments, the second dataset can correspond to user sequences representative of user actions of the plurality of users at their respective user devices during the second time period, the user sequences in the second dataset being in response to content items provided as recommendations to the respective user devices of the plurality of users by another model such as, for example, a previous model version that was previously utilized at the networked system for providing the content item recommendations. In FIG. 3, the first dataset is shown as streaming data 302, the second dataset is shown as batch data 304, and the model is shown as model 306.

The first dataset can also include feedback data obtained from the plurality of user devices. In some embodiments, the feedback data can be obtained using a feedback loop of the recommendation system. The feedback data can be generated at the respective user device based on user behavior of a user of the respective user device. In some embodiments, the feedback data can be obtained based on user sequences representative of the user actions of the plurality of users in response to content items provided to the plurality of user devices by the previous model In FIG. 3, the feedback data is shown as block 320.

At 220, the method includes extracting a first set of embeddings from the first dataset and extract a second set of embeddings from the second dataset. The first set of embeddings can be representative of one or more features identified in the first dataset and the second set of embeddings can be representative of one or more features identified in the second dataset. In some embodiments, the first set of embeddings and the second set of embeddings may be relevant features identified in the first dataset and the second dataset, respectively, based on the attributes associated with the features. In some embodiments, the method includes transforming the features in the first dataset and the second dataset to respective embeddings to enable identification of the relevant features and to enable the further processing of the extracted embeddings by the model to determine the content items as prediction outputs. In FIG. 3, the pre-processing of the input datasets is shown at block 308, the first set of embeddings is shown as feature embeddings 310, and the second set of embeddings is shown at feature embeddings 312.

At 230, the method includes outputting a trained model based on applying the first set of embedding and the second set of embeddings. In some embodiments, the first dataset, or a portion thereof, obtained at 210 can include data generated in response to content item recommendations provided by the model that is being trained. In some embodiments, the first dataset, or a portion thereof, obtained at 210 can include data generated in response to content item recommendations provided by a previous model prior to the current model, and the current model can be trained utilizing one or more embeddings determined based on the first dataset to train the current model.

In some embodiments, the trained model can be a fine-tuned model using reinforcement learning as continual learning. Fine-tuning the model can include updating values for one or more weights at one or more respective layers of the model based on applying one or more model algorithms to the first set of embeddings and the second set of embeddings. In some embodiments, the updating of the values for one or more weights at the one or more respective layers of the model can further be based on one or more metrics. In some embodiments, the outputs determined by the model based on applying the one or more model algorithms to the input embeddings can be based on the one or more metrics. In some embodiments, the one or more weights that are updated based on the model training can be at a single layer of the model. In other embodiments, the one or more weights that are updated based on the model training can be at an output layer of the model.

In some embodiments, the trained model can be a pre-trained model from scratch. In some embodiments, the pre-trained model can be trained based on the first dataset and the second dataset. In other embodiments, the pre-trained model can be trained based on the first set of embeddings and the second set of embeddings.

At 240, the method includes determine a prediction value for each respective candidate content item of a set of candidate content items by the trained model. In some embodiments, the prediction values determined by the trained model can be based on one or more user sequences associated with a respective user device represented in the first set of embeddings and the second set of embeddings. In some embodiments, the prediction values are representative of a prediction of positive feedback for one or more candidate content items determined by the model based on the first set of embeddings and the second set of embeddings. In some embodiments, each prediction value is representative of a respective prediction of positive feedback for a respective candidate content item determined by the trained model. In FIG. 3, the candidate content items are shown as predictions 322.

At 250, the method includes outputting at least one content item of the set of candidate content items to the given user device based on the prediction value determined for each respective candidate content item of the set of candidate content items. In FIG. 3, the at least one content item that is output to the user device is shown at 324.

In some embodiments, the at least one content item output by the recommendation system can be selected from the set of candidate content items based on filtering the set of candidate content items according to one or more rules. In some embodiments, the one or more rules can include, but is not limited to, an eligibility of the user for the candidate content item. For example, the content item filtered from the set of candidate content items based on the one or more rules can be for completing an electronic transaction when the user has not initiated the corresponding electronic transaction related to the candidate content item. In this regard, the one or more rules allows for the recommendation system to provide relevant content items to the plurality of user devices based on the user behaviors determined based on the first dataset, second dataset, other datasets, or any combination thereof, and also based applying the one or more rules to the set of candidate content items output by the trained model. In FIG. 3, the one or more rules are shown as rules layer 324.

Figure 4:
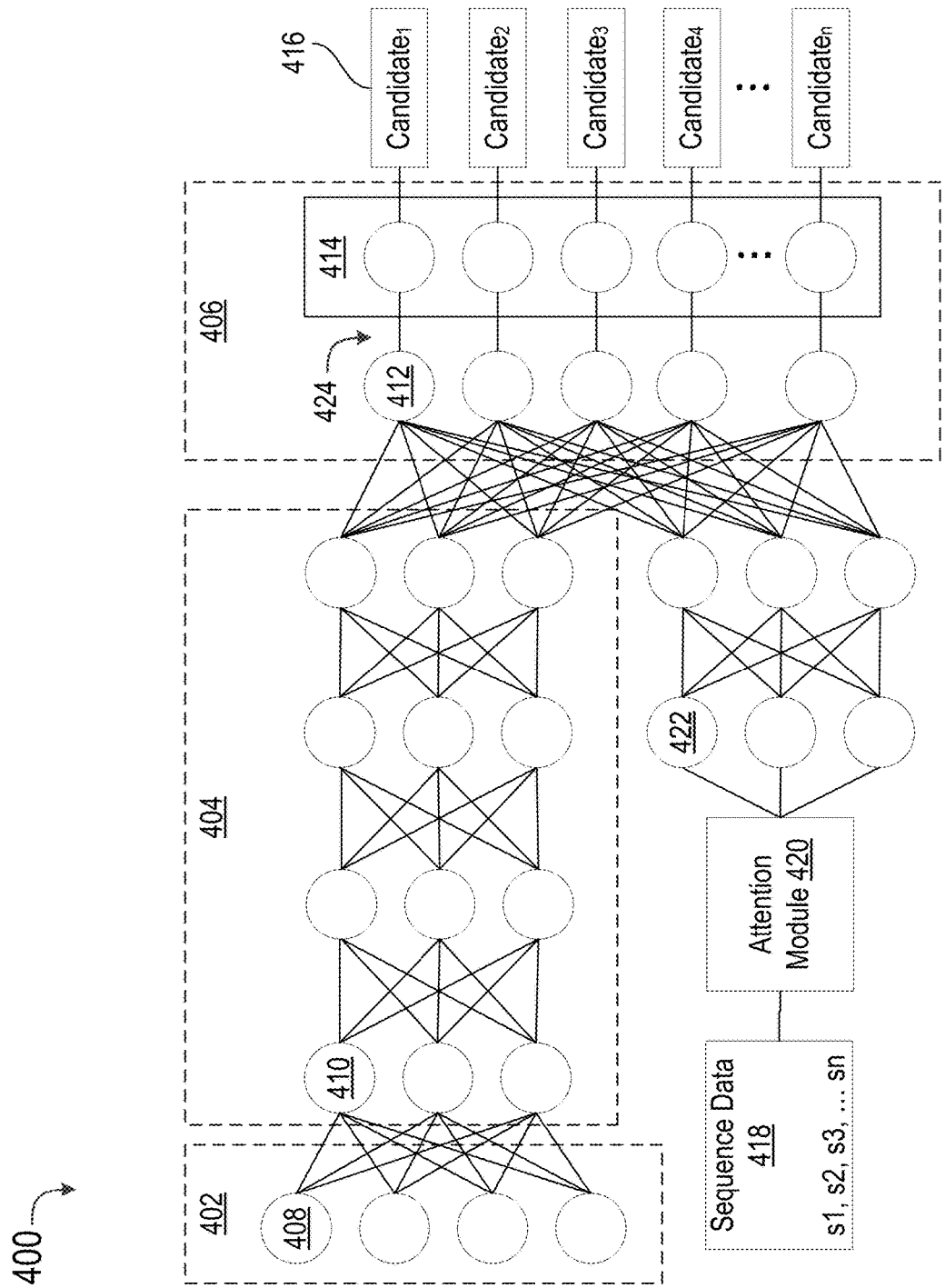
FIG. 4 is a block diagram illustrating an example architecture of a model for predicting the content item recommendations, according to some embodiments.

FIG. 4 is a block diagram illustrating an example architecture of a model 400 for predicting the content item recommendations, according to some embodiments. The model can be embodied in one or more of the functional modules of recommendation system 102 in FIG. 1, according to some embodiments. In some embodiments, the model 400 can be the model 314 or model 316 as shown in FIG. 3, among other models.

The model 400 provided by the recommendation system 102 can be a neural network model. The model 400 can include one or more layers 402, 404, 406. The model 400 provides content items (e.g., content recommendations) as output predictions based on applying the input data into the model 400 and applying one or more model algorithms at the one or more layers 402, 404, 406. The model 400 can include an input layer 402, one or more hidden layers 404, and an output layer 406. In some embodiments, the layers of model 400 can include at least one of convolutional layers, fully-connected layers, function layers, other neural network model layers, or any combination thereof. In some embodiments, the model 400 is a deep Q-network model.

The model 400 includes the input layer 402. The model 400 can receive data 408 as input at the input layer 402 for the model 400 to apply one or more algorithms thereto. The data 408 can include, but is not limited to, text data, numerical data, image data, other types of data, or any combinations thereof. In some embodiments, the data 408 can correspond to raw data that is to be processed by the model 400 at the hidden layers 404. In some embodiments, the data 408 at the input layer 402 can be representative of features, embeddings, attributes, other data, or any combinations thereof. In some embodiments, the model 400 can apply one or more algorithms to the data 408 at the input layer 402 to perform one or more model techniques including, but not limited to, identifying features or attributes, transforming features or attributes into embeddings, extracting embeddings, other model techniques, or any combinations thereof, based on the data 408.

The model 400 includes one or more hidden layers 404. The model 400 can apply one or more algorithms to the data 410 at the one or more hidden layers 404 to transform the data 410 based on one or more parameters. The algorithms applied at the hidden layers 404 can be based on one or more parameters can include, but is not limited to, policies, metrics, other parameters, or any combinations thereof, at the recommendation system 102. In some embodiments, the algorithms applied to transform the data 410 at the hidden layers 404 of model 400 can be based on one or more policies at the recommendation system 102. In some embodiments, the algorithms applied by the model 400 at the hidden layers 404 can be based on one or more policies at the recommendation system 102. In some embodiments, the algorithms applied by the model 400 at the hidden layers 404 can be based on one or more metrics.

The model 400 includes the output layer 406. The model 400 can apply the one or more algorithms to the data at the hidden layers 404 and outputs data 412 as function values 414 at the one or more layers 406. The function values 414 can correspond to a respective candidate content item 416 being output by the model 400 for recommendation based on applying the one or more algorithms to the data input to the input layer 402. In some embodiments, the function values 414 can be reward values (e.g., scores) representative of a prediction of a probability of a positive feedback for a respective candidate content item 416. For example, a reward score can be representative of a prediction of a probability of a positive feedback received by the recommendation system 102 for an action performed by a user at a respective user device such as, for example, user device 108a, in FIG. 1, the action being performed by the user in response to a respective one of the set of the candidate content items 416 output by model 400.

The model 400 can also obtain sequence data 418, according to some embodiments. The sequence data 418 can correspond to user sequences based on user actions performed at a respective user devices. In some embodiments, the sequence data 418 can be obtained by the model 400 at the input layer 402, and the model 400 can apply one or more algorithms to the sequence data 418 at the one or more layers 402, 404, 406 to determine the function values 414 and provide the respective candidate content item 416 as recommendations based on the function values 414.

In some embodiments, the model 400 can include an attention module 420. The attention module 420 can be configured to perform one or more operations including, but not limited to, obtain the sequence data 418, identify trajectories based on one or more features in the sequence data 418, transform the features into embeddings 422 corresponding to states of an environment of the model 400 for further processing by one or more layers of the model 400, or any combinations thereof, among other operations. The embeddings 422 can, for example, be determined by the attention module 420 and the model 400 can apply the one or more algorithms to the embeddings 422 to determine the data 412. In some embodiments, the model 400 can determine the data 412 and/or the function values 414 based on applying the one or more algorithms to data in the model 400 including, but not limited to, data 408, data 410, data 412, other data of the model, or any combinations thereof.

The model 400 can also be trained using reinforcement learning for continual learning. In this regard, the model 400 can obtain feedback data corresponding to user actions at the respective user devices based on content items provided to the user devices as recommendations by recommendation system 102, the content items being selected by recommendation system 102 from, for example, the set of candidate content item 416 predicted by model 400. In some embodiments, the feedback data can be obtained as one of the data 408, sequence data 418, or both the data 408 and sequence data 418. In some embodiments, the feedback data can be obtained at the input layer 402. In some embodiments, the feedback data can be obtained as one or more trajectories in the sequence data 418, and the feedback in the sequence data 418 can correspond to the user sequences based on user actions performed at the respective user devices in response to content items determined by the model 400 and sent to the respective user devices by the recommendation system 102.

The training of the model 400 can include updating one or more weights applied by the model 400 at a respective layer to determine the function values 414. In some embodiments, the training of the model 400 can include fine-tuning the one or more weights applied by the model 400 at the output layer 406 to determine the function values 414. The one or more weights that are updated can be, for example, applied by the model 400 at location 424 in FIG. 4.

Figure 5:
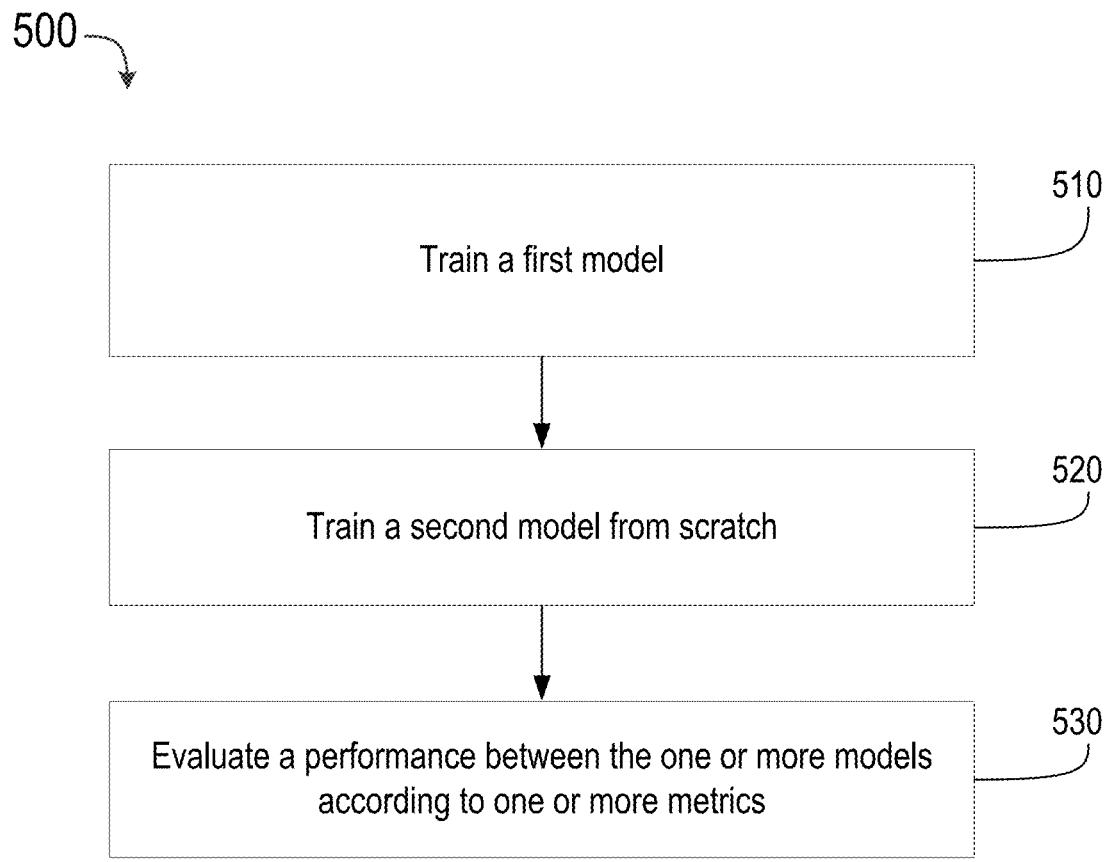
FIG. 5 is a flow diagram of an example method for determining a trained model, according to some embodiments.

FIG. 5 is a flow diagram of an example method 500 for determining a trained model, according to some embodiments. The method 500 may be an embodiment of operation 230 of method 200 in FIG. 2. The method 500, or one or more portions thereof, can be performed by the functional modules in recommendation system 102 in conjunction with datastore 104, data processing system 106, network 110, or any combination thereof, and thus may be computer implemented.

Figure 6:
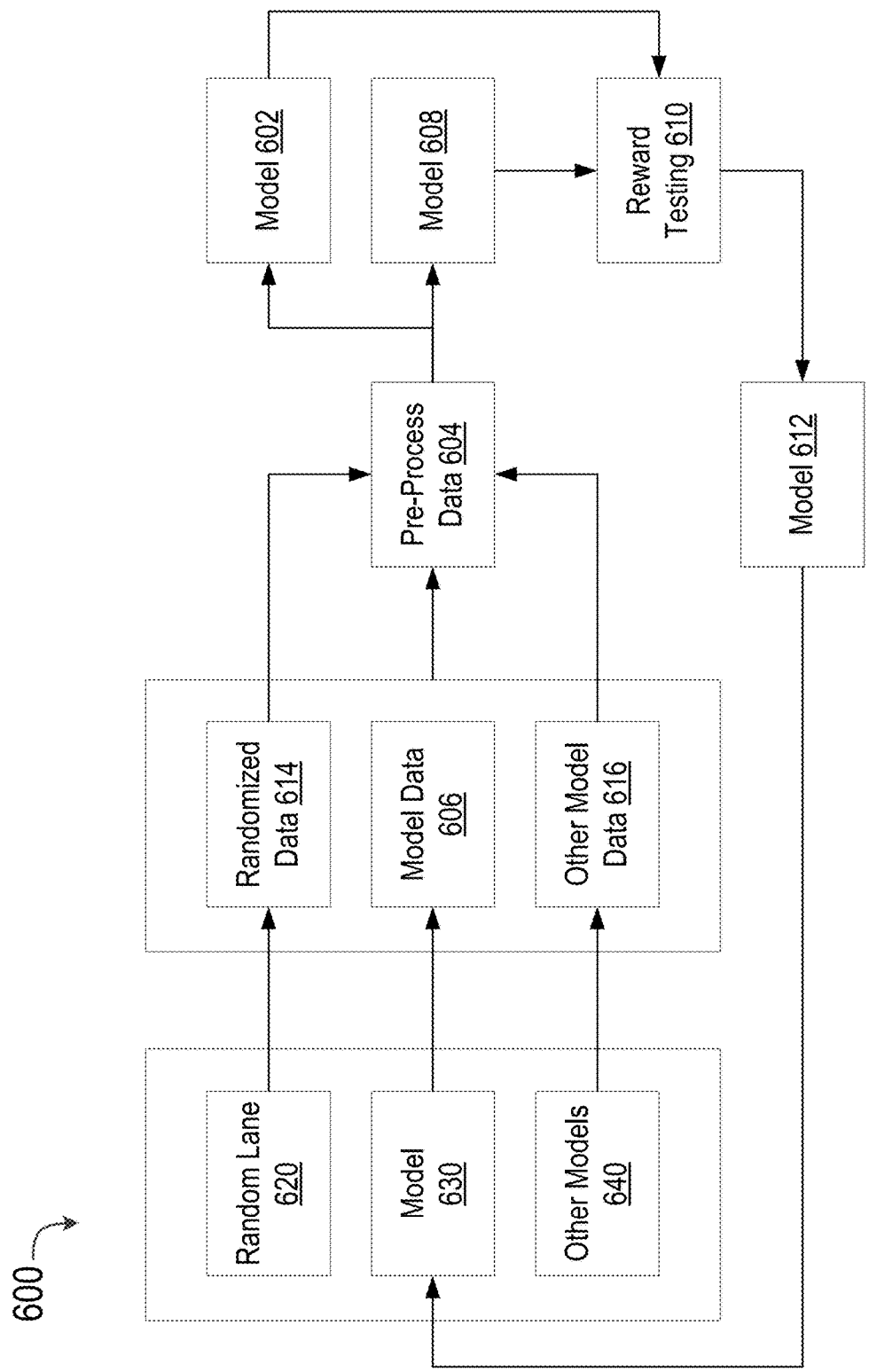
FIG. 6 is a block diagram of a system, according to some embodiments.

FIG. 6 is a block diagram of a system 600, according to some embodiments. The system 600 can perform one or more methods including methods 200, 500, or portions thereof, according to some embodiments. The method 500 will be described in conjunction with system 600. In some embodiments, the system 100 can include the system 600 embodied by one or more of the functional modules at recommendation system 102 in FIG. 1.

Figure 7:
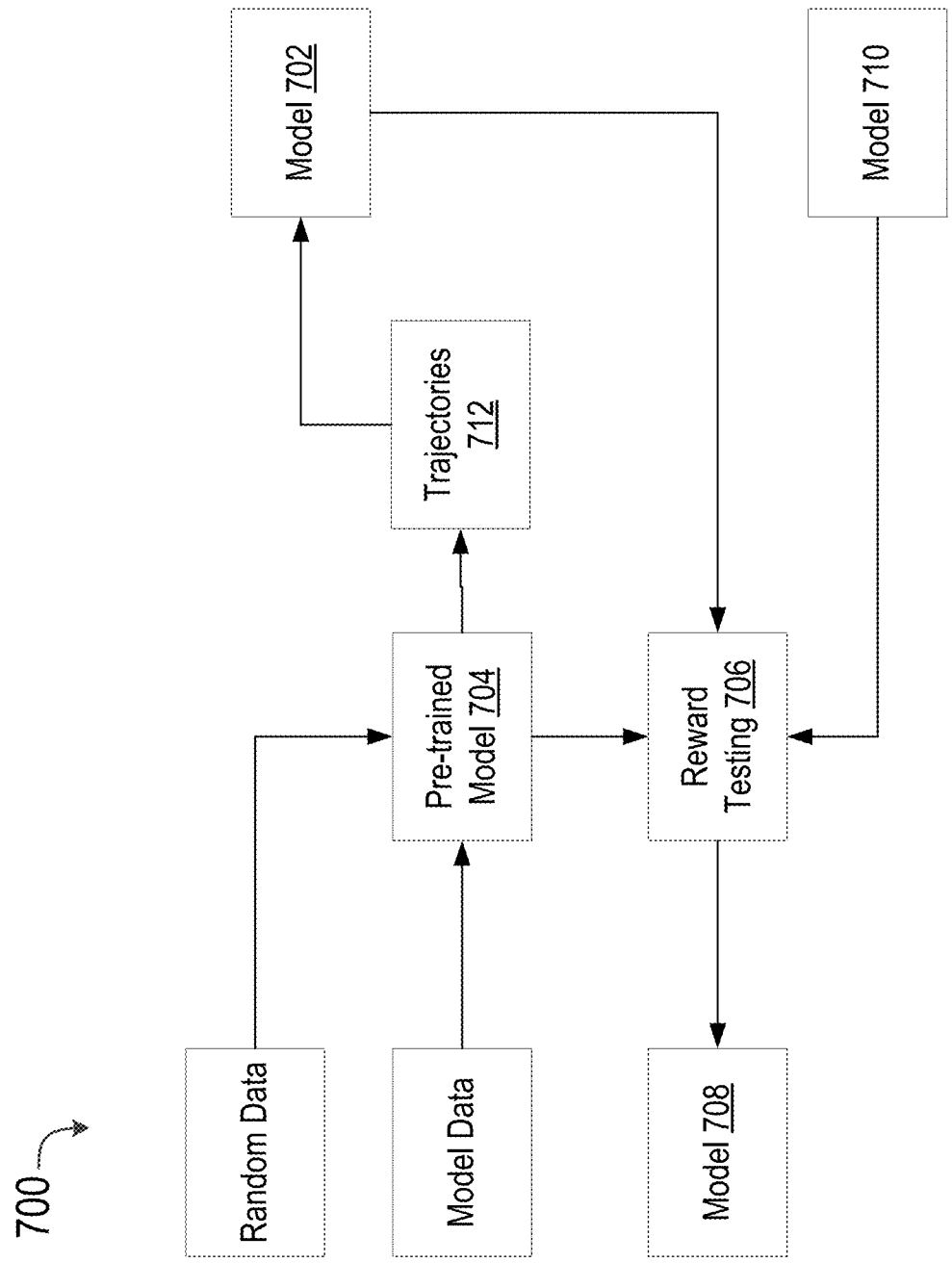
FIG. 7 is a block diagram of a system, according to some embodiments.

FIG. 7 is a block diagram of a system 700, according to some embodiments. The system 700 can perform one or more methods including methods 200, 500, or portions thereof, according to some embodiments. The method 500 will be described in conjunction with system 700. In some embodiments, the system 100 can include the system 700 embodied by one or more of the functional modules at recommendation system 102 in FIG. 1.

At 510, the method includes training a first model. In some embodiments, the first model can be trained based on applying the first set of embeddings and the second set of embeddings. In some embodiments, the first model includes a previous model trained using the first set of embeddings and the second set of embeddings. In FIG. 6, the first model is shown as model 602, the first set of embeddings and the second set of embeddings can be determined at block 604, and the first set of embeddings and the second set of embeddings can be based on the model data 606. In FIG. 6, the previous model is shown as model 630. In FIG. 7, the first model is shown as model 702.

In some embodiments, training the first model includes applying data corresponding to user sequences to the first model. In some embodiments, the data corresponding to the user sequences can be trajectories based on the user actions. In some embodiments, the data can be clickstream data corresponding to user sequences based on user actions in response to content items provided to the user devices by the recommendation system and determined by a previous model, and which the clickstream data is then used to train the first model. In this regard, the data corresponding to the user sequences can be trajectories determined by the recommendation system based on, for example, the browsing history of the users at the user devices at a time when a certain page was reached on the web browser. In some embodiments, the data can correspond to state values representative of the trajectories. In FIG. 7, the trajectories are shown as trajectories 712.

At 520, the method includes training a second model from scratch based on applying the first set of embeddings and the second set of embeddings. In FIG. 6, the second model is shown as model 608. In FIG. 7, the second model is shown as pre-trained model 704.

At 530, the method includes evaluate a performance between the one or more models according to one or more metrics. In some embodiments, the one or more models includes the first model and the second model. In some embodiments, the performance evaluation comprises performing reward testing. In some embodiments, the reward testing is A/B testing. In FIG. 6, the performance between models is evaluated at block 610. In FIG. 7, the performance between models is evaluated at block 706.

In some embodiments, the trained model output by the recommendation system 102 comprises one of the first model and the second model determined for outputting based on the evaluation. In some embodiments, the trained model provided by the recommendation system 102 of the first model and the second model is determined based on the one or more metrics. In some embodiments, the metrics can be based on a business objective of the entity of the recommendation system 102. In FIG. 6, the trained model is shown as model 612. In FIG. 7, the trained model is shown as model 708.

In some embodiments, the one or more models can include the first model, the second model, and the previous model. In this regard, in some embodiments, the trained model output by the recommendation system 102 can be one of the first model, the second model, and the previous model determined for outputting based on the evaluation. In FIG. 6, the previous model is shown at model 630. In FIG. 7, the previous model is shown at model 710.

In some embodiments, the method can further include obtaining a third dataset corresponding to randomized data based on the user actions of at least one user of the plurality of users and extracting a third set of embeddings from the third dataset. The randomized data can be obtained at a random data traffic lane of the recommendation system. The random data traffic lane acts as an offline replay buffer for the recommendation system. In addition, utilizing randomized data addresses cold start problems associated with static datasets when new data such as, for example, actions, sequences, behaviors, queries, and the like, that the current model may not have been exposed to previously. In addition, utilizing the randomized data also improves bias that may develop from using static datasets.

In some embodiments, training the one or more models includes applying the first set of embeddings, the second set of embeddings, and the third set of embeddings to the respective model. In some embodiments, training the one or more models includes applying the first set of embeddings, the second set of embeddings, and the third set of embeddings to the first model and the second model. In some embodiments, the prediction value determined for each respective first candidate content item of the set of first candidate content items by the trained model is based on the first set of embeddings, the second set of embeddings, and the third set of embeddings. In FIG. 6, the third dataset is shown as randomized data 614, the third set of embeddings can be determined at block 604, and the random data traffic lane is shown as random lane 620.

In some embodiments, the method can further include obtaining a fourth dataset corresponding to data output by other models based on applying data corresponding to the user actions of the plurality of users, and the method can further include extracting a fourth set of embeddings from the fourth dataset. The fourth dataset can be obtained at a data traffic lane of the other models of the recommendation system. The fourth dataset can be utilized for determining technical limitations of the one or more models in the recommendation system during the outputting of the trained model.

In some embodiments, training the one or more models includes applying the first set of embeddings, the second set of embeddings, the third set of embeddings, and the fourth set of embeddings to the respective model. In other embodiments, training the one or more models includes applying at least one of the first set of embeddings, second set of embeddings, third set of embeddings, fourth set of embeddings, a portion thereof, or any combinations thereof, to the respective model. In some embodiments, training the one or more models includes applying the first set of embeddings, second set of embeddings, third set of embeddings, and the fourth set of embeddings to the first model and the second model. In some embodiments, the prediction value determined for each respective first candidate content item of the set of first candidate content items by the trained model is based on at least a portion of the first set of embeddings, second set of embeddings, the third set of embeddings, fourth set of embeddings, or any combination thereof. In FIG. 6, the fourth dataset is shown as other model data 616, and the other models data traffic lane is shown as other model lane 640.

Figure 8:
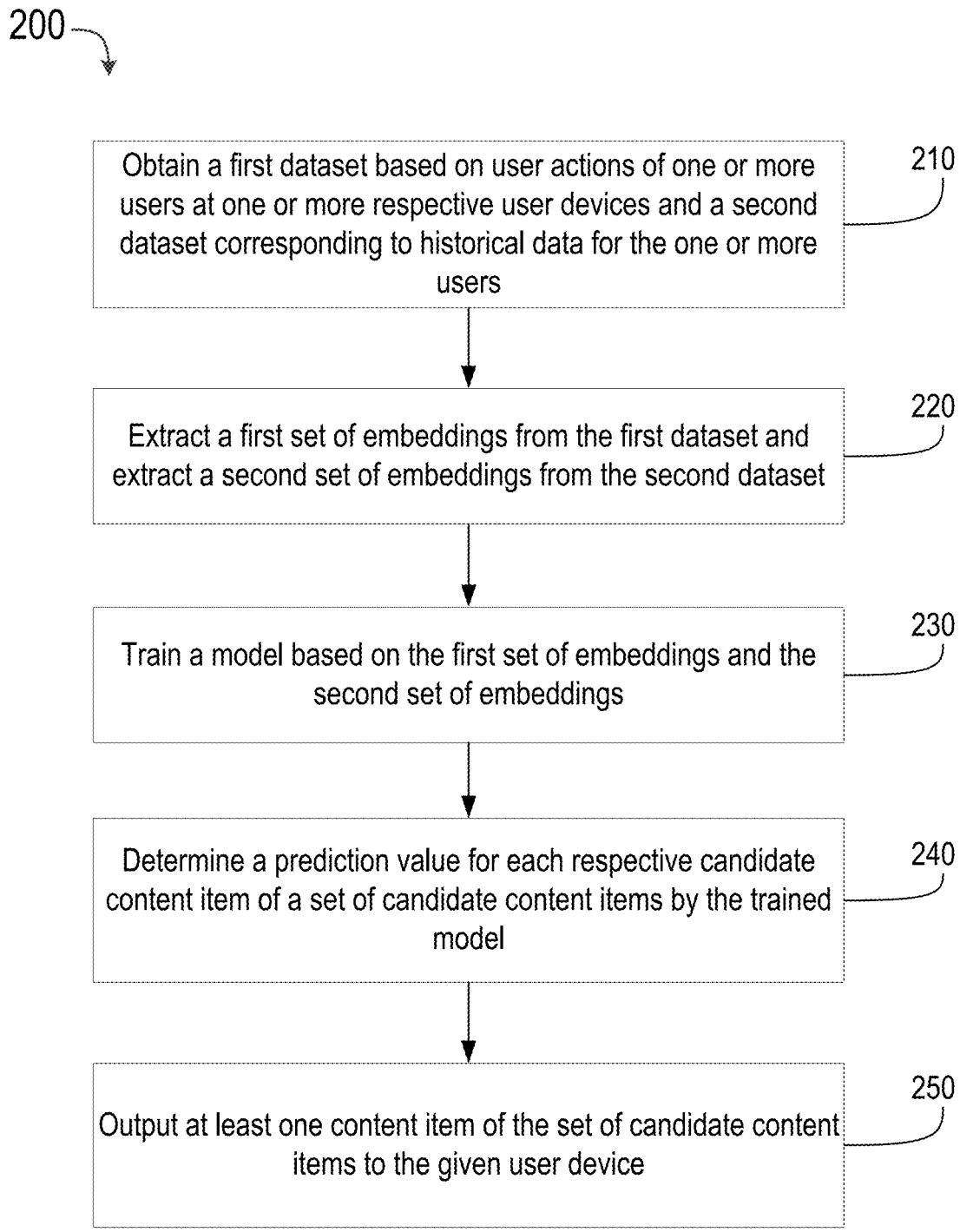
FIG. 8 is a flow diagram of an example method for training a model using reinforcement learning for continual learning, according to some embodiments.

FIG. 8 is a flow diagram of an example method 800 for training a model using reinforcement learning for continual learning, according to some embodiments. The method 800 may be an embodiment of operation 230 of method 200 in FIG. 2. The method 800 may be an embodiment of operation 510 of method 500 in FIG. 5. The method 800, or one or more portions thereof, can be performed by the functional modules in recommendation system 102 in conjunction with datastore 104, data processing system 106, network 110, or any combination thereof, and thus may be computer implemented.

Figure 9:
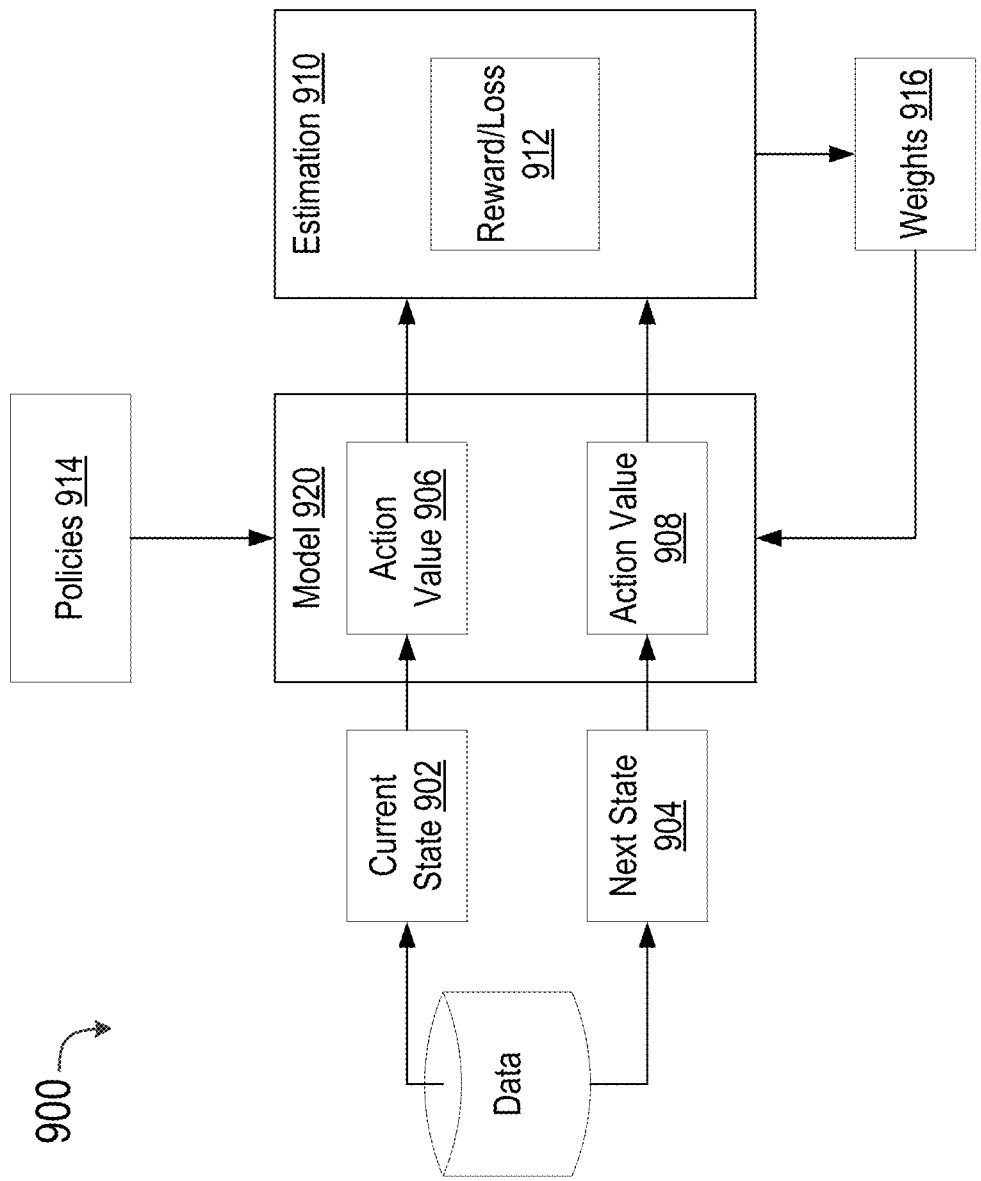
FIG. 9 is a block diagram of a system, according to some embodiments.

FIG. 9 is a block diagram of a system 900, according to some embodiments. The system 900 can perform one or more methods including methods 200, 500, or portions thereof, according to some embodiments. The method 800 will be described in conjunction with system 900. In some embodiments, the system 100 can include the system 900 embodied by one or more of the functional modules at recommendation system 102 in FIG. 1.

At method 800, a previous model of the recommendation system can be trained using training data to provide the first model. At 810, the method includes determining a set of state values representative of the user actions in the first dataset based on the first set of embeddings and the second set of embeddings. In some embodiments, the set of state values can include one or more states. In some embodiments, the set of state values can include, but is not limited to, a current state, a next state, other subsequent states, or any combination thereof. In some embodiments, one or more of the state values can correspond to a trajectory determined based on the user actions of the plurality of users. For example, a current state and the next state can be based on user actions of a given user of the plurality of users.

to a current state determined based on an environment of the model. In FIG. 9, the previous model is shown as model 920, and the set of state values can include the current state shown as current states 902 and the next state shown as next state 904. It is to be appreciated by those having ordinary skill in the art that the states as shown in FIG. 9 are not intended to be limited to the current and next states and can include a sequence of states observed during a period of time, which can include therein the current state and the next state.

At 820, the method includes determining an action value for each respective state value of the set of state values by applying one or more algorithms to the set of state values. In some embodiments, each respective action value determined by the model can be based on applying the one or more algorithms of the model to a respective state value of the set of state values. In some embodiments, the set of state values includes the current state and the next state, and determining the action value includes determining a first action value based on the current state and determining a second action value based on the current state. In FIG. 9, the model is shown as model 920, and the action value includes the first action value shown as action value 906 and the second action value shown as action value 908.

At 830, the method includes determining reward scores based on the action value determined for each respective state value of the set of state values. In some embodiments, training the first model using reinforcement learning includes applying the one or more algorithms to each state value of the set of state values, determining a corresponding prediction function based on the reward scores estimated by the model that can be obtained for a respective action value. In some embodiments, the reward scores can be a reward score, a loss score, or both, determined based on applying the one or more algorithms by the model. In FIG. 9, the estimation is shown at block 910, and the reward/loss scores are shown at block 912.

In some embodiments, the respective action values can also be determined by the model based on a policy of the recommendation system being applied by the model. The policy corresponding to a mapping between a state-action pair determined based on the application of the one or more algorithms of the model and based on one or more metrics. In some embodiments, the training of the model comprises fine-tuning the model in an environment that allows an agent of the model to learn an optimal prediction function by navigating the sequence of trajectories included in the sequence of state values and determining respective action values as output based on observing properties of the environment in response to the agent's actions. In some embodiments, the optimal prediction function is learned using a Markov decision process. In other embodiments, the optimal prediction function is learned by applying a Bellman equation. In some embodiments, the agent can be capable of identifying changes in the environment and adapted to the changes by, for example, determining a different action or series of actions from the initial action or series of actions in response to the change in the environment. In addition, based on a policy of the model, the action or series of actions determined by the agent can be configured to maximize an expected return of a state-action pair. In FIG. 9, the policy is shown as policies 914.

At 840, the method includes updating one or more weights at an output layer of the model being trained based on the reward scores and the action value determined for each respective state value. In some embodiments, the one or more weights of the model being trained can be updated based on the reward scores determined at operation 830. In FIG. 9, the weights are shown as weights 916. Referring to FIG. 4, the output layer is shown as output layer 406.

Figure 10:
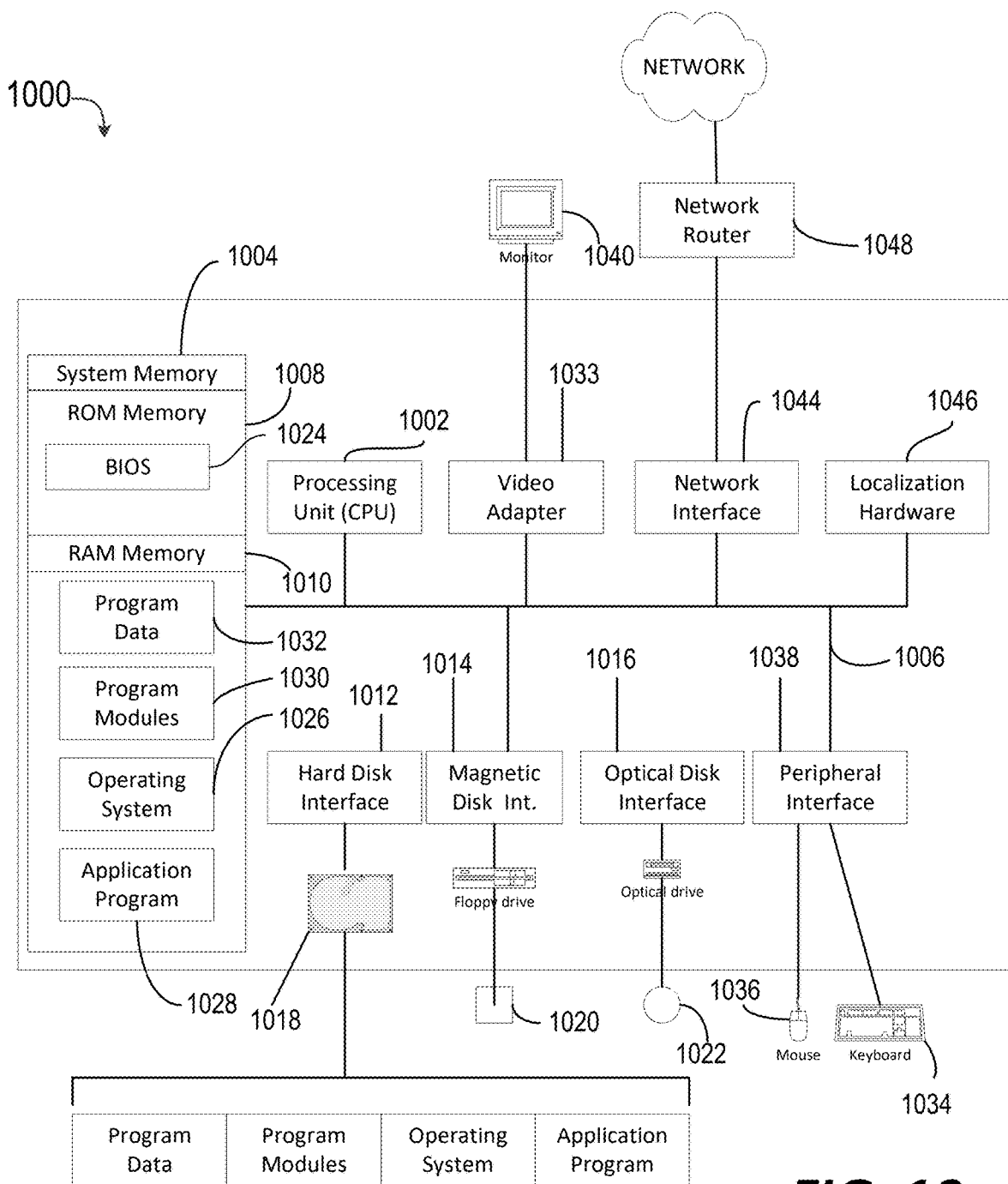
FIG. 10 is a block diagram of an example computing system, according to some embodiments.

FIG. 10 is a block diagram of an example computing system 1000, according to some embodiments.

The computing system 1000 can be, for example, a desktop computer, laptop, smartphone, tablet, or any other such device having the ability to execute instructions, such as those stored within a non-transient, computer-readable medium. Furthermore, while described and illustrated in the context of a single computing system 1000, those skilled in the art will also appreciate that the various tasks described hereinafter may be practiced in a distributed environment having multiple computing systems 1000 linked via a local or wide-area network in which the executable instructions may be associated with and/or executed by one or more of multiple computing systems 1000.

In its most basic configuration, computing system environment 1000 typically includes at least one processing unit 1002 and at least one memory 1004, which may be linked via a bus 1006. Depending on the exact configuration and type of computing system environment, memory 1004 may be volatile (such as RAM 1010), non-volatile (such as ROM 1008, flash memory, etc.) or some combination of the two. Computing system environment 1000 may have additional features and/or functionality. For example, computing system environment 1000 may also include additional storage (removable and/or non-removable) including, but not limited to, magnetic or optical disks, tape drives and/or flash drives. Such additional memory devices may be made accessible to the computing system environment 1000 by means of, for example, a hard disk drive interface 1012, a magnetic disk drive interface 1014, and/or an optical disk drive interface 1016. As will be understood, these devices, which would be linked to the system bus 1006, respectively, allow for reading from and writing to a hard disk 1018, reading from or writing to a removable magnetic disk 1020, and/or for reading from or writing to a removable optical disk 1022, such as a CD/DVD ROM or other optical media. The drive interfaces and their associated computer-readable media allow for the nonvolatile storage of computer readable instructions, data structures, program modules and other data for the computing system environment 1000. Those skilled in the art will further appreciate that other types of computer readable media that can store data may be used for this same purpose. Examples of such media devices include, but are not limited to, magnetic cassettes, flash memory cards, digital videodisks, Bernoulli cartridges, random access memories, nano-drives, memory sticks, other read/write and/or read-only memories and/or any other method or technology for storage of information such as computer readable instructions, data structures, program modules or other data. Any such computer storage media may be part of computing system environment 1000.

A number of program modules may be stored in one or more of the memory/media devices. For example, a basic input/output system (BIOS) 1024, containing the basic routines that help to transfer information between elements within the computing system environment 1000, such as during start-up, may be stored in ROM 1008. Similarly, RAM 1010, hard drive 1018, and/or peripheral memory devices may be used to store computer executable instructions comprising an operating system 1026, one or more applications programs 1028, other program modules 1030, and/or program data 1032. Still further, computer-executable instructions may be downloaded to the computing environment 1000 as needed, for example, via a network connection. The applications programs 1028 may include, for example, a browser, including a particular browser application and version, which browser application and version may be relevant to determinations of correspondence between communications and user URL requests, as described herein. Similarly, the operating system 1026 and its version may be relevant to determinations of correspondence between communications and user URL requests, as described herein.

An end-user may enter commands and information into the computing system environment 1000 through input devices such as a keyboard 1034 and/or a pointing device 1036. While not illustrated, other input devices may include a microphone, a joystick, a game pad, a scanner, etc. These and other input devices would typically be connected to the processing unit 1002 by means of a peripheral interface 1038 which, in turn, would be coupled to bus 1006. Input devices may be directly or indirectly connected to processor 1002 via interfaces such as, for example, a parallel port, game port, firewire, or a universal serial bus (USB). To view information from the computing system environment 1000, a monitor 1040 or other type of display device may also be connected to bus 1006 via an interface, such as via video adapter 1033. In addition to the monitor 1040, the computing system environment 1000 may also include other peripheral output devices, not shown, such as speakers and printers.

The computing system environment 1000 may also utilize logical connections to one or more computing system environments. Communications between the computing system environment 1000 and the remote computing system environment may be exchanged via a further processing device, such a network router 1048, that is responsible for network routing. Communications with the network router 1048 may be performed via a network interface component 1044. Thus, within such a networked environment, e.g., the Internet, World Wide Web, LAN, or other like type of wired or wireless network, it will be appreciated that program modules depicted relative to the computing system environment 1000, or portions thereof, may be stored in the memory storage device(s) of the computing system environment 1000.

The computing system environment 1000 may also include localization hardware 1046 for determining a location of the computing system environment 1000. In embodiments, the localization hardware 1046 may include, for example only, a GPS antenna, an RFID chip or reader, a WiFi antenna, or other computing hardware that may be used to capture or transmit signals that may be used to determine the location of the computing system environment 1000. Data from the localization hardware 1046 may be included in a callback request or other user computing device metadata in the methods of this disclosure.

The computing system, or one or more portions thereof, may embody a user computing device 108, in some embodiments. Additionally, or alternatively, some components of the computing system 1000 may embody the recommendation system 102 and/or data processing system 106. For example, the functional modules 120, 122, 124, 126, 128, 130 may be embodied as program modules 1330. For example, the model component 112 may be embodied as program modules 1330.

All prior patents and publications referenced herein are incorporated by reference in their entireties.

Throughout the specification and claims, the following terms take the meanings explicitly associated herein, unless the context clearly dictates otherwise. The phrases "in one embodiment," "in an embodiment," and "in some embodiments" as used herein do not necessarily refer to the same embodiment(s), though it may. Furthermore, the phrases "in another embodiment" and "in some other embodiments" as used herein do not necessarily refer to a different embodiment, although it may. All embodiments of the disclosure are intended to be combinable without departing from the scope or spirit of the disclosure.

As used herein, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

In some embodiments, a system includes a processor, a non-transitory computer readable media having stored thereon instructions that are executable by the processor to perform operations including obtain a first dataset corresponding to user actions of a plurality of users at a plurality of user devices and a second dataset corresponding to historical data for the plurality of users, extract a first set of embeddings from the first dataset and extract a second set of embeddings from the second dataset, output a trained model based on applying the first set of embeddings and the second set of embeddings, determine a set of first candidate content items by the trained model based on the first set of embeddings and the second set of embeddings, determine a prediction value for each respective first candidate content item of the set of first candidate content items by the trained model based on the first set of embeddings and the second set of embeddings, and output one or more first content items of the set of first candidate content items based on the prediction value determined for each respective first candidate content item.

In some embodiments, the processor further performs operations including train a first model based on applying the first set of embeddings and the second set of embeddings, the first model including a previous model trained using the first set of embeddings and the second set of embeddings, train a second model from scratch based on applying the first set of embeddings and the second set of embeddings, and evaluate a performance between the first model and the second model according to one or more metrics, the trained model including one of the first model and the second model determined for outputting based on the evaluation.

In some embodiments, evaluating the performance between the first model and the second model includes evaluate the performance between the first model, the second model, and the previous model according to the one or more metrics. In some embodiments, the trained model includes one of the first model, the second model, and the previous model determined for outputting based on the evaluation.

In some embodiments, the user actions of the first dataset correspond to user sequences of the plurality of users in response to content items provided by the previous model.

In some embodiments, the processor further performs operations including obtain a third dataset corresponding to randomized data based on the user actions of at least one user of the plurality of users, extract a third set of embeddings from the third dataset. In some embodiments, training the first model and the second model includes applying the first set of embeddings, the second set of embeddings, and the third set of embeddings. In some embodiments, the prediction value determined for each respective first candidate content item of the set of first candidate content items by the trained model is based on the first set of embeddings, the second set of embeddings, and the third set of embeddings.

In some embodiments, the randomized data corresponds to a portion of the user actions performed by the plurality of users at the plurality of user devices.

In some embodiments, the randomized data corresponds to about 1% of the user actions performed by the plurality of users in a network of the system.

In some embodiments, the processor further performs operations including obtain data corresponding to the one or more metrics as inputs from a computing device associated with an entity of the system.

In some embodiments, training the first model based on applying the first set of embeddings and the second set of embeddings includes determine a set of state values representative of the user actions in the first dataset based on the first set of embeddings and the second set of embeddings, determine an action value for each respective state value of the set of state values by applying one or more algorithms to the set of state values, determine reward scores based on the action value determined for each respective state value of the set of state values, and update one or more weights at an output layer based on the reward scores and the action value determined for each respective state value.

In some embodiments, the trained model can be an off-policy model.

In some embodiments, the first dataset is obtained at a first time period and the second dataset is obtained at a second time period, the second time period occurring before the first time period.

In some embodiments, a method includes obtaining, by a computing device, a first dataset corresponding to user actions of a plurality of users at a plurality of user devices and a second dataset corresponding to historical data for the plurality of users, extracting, by the computing device, a first set of embeddings from the first dataset and extract a second set of embeddings from the second dataset, training a first model based on applying the first set of embeddings and the second set of embeddings, the first model including a previous model trained using the first set of embeddings and the second set of embeddings, training a second model from scratch based on applying the first set of embeddings and the second set of embeddings, evaluating, by the computing device, a performance between the first model and the second model according to one or more metrics, outputting, by the computing device, a trained model based on applying the first set of embeddings and the second set of embeddings, the trained model including one of the first model and the second model determined for outputting based on the evaluation, determining a set of first candidate content items by the trained model based on the first set of embeddings and the second set of embeddings, determining a prediction value for each respective first candidate content item of the set of first candidate content items by the trained model based on the first set of embeddings and the second set of embeddings, and outputting, by the computing device, one or more first content items of the set of first candidate content items based on the prediction value determined for each respective first candidate content item, the user actions of the first dataset corresponding to user sequences of the plurality of users in response to content items provided by the previous model.

In some embodiments, evaluating the performance between the trained model and the first model includes evaluating, by the computing device, the performance between the trained model, the first model, and the previous model according to the one or more metrics. In some embodiments, the trained model includes one of the first model, the second model, and the previous model determined for outputting based on the evaluation.

In some embodiments, the method further includes obtaining, by the computing device, a third dataset corresponding to randomized data based on user actions of at least one user of the plurality of users, wherein the randomized data corresponds to a portion of the user actions performed by the plurality of users at the plurality of user devices, and extracting, by the computing device, a third set of embeddings from the third dataset. In some embodiments, training the first model and the second model includes applying the first set of embeddings, the second set of embeddings, and the third set of embeddings. In some embodiments, the prediction value determined for each respective first candidate content item by the trained model is based on the first set of embeddings, the second set of embeddings, and the third set of embeddings.

In some embodiments, the method further includes obtaining, by the computing device, data corresponding to the one or more metrics as inputs from a second computing device associated with an entity.

In some embodiments, a non-transitory computer readable media having stored therein instructions that are executable by a processor to perform operations including: obtain a first dataset corresponding to user actions of a plurality of users at a plurality of user devices and a second dataset corresponding to historical data for the plurality of users, extract a first set of embeddings from the first dataset and extract a second set of embeddings from the second dataset, train a first model based on applying the first set of embeddings and the second set of embeddings, the first model including a previous model trained using the first set of embeddings and the second set of embeddings, output a trained model based on applying the first set of embeddings and the second set of embeddings, the trained model including the first model, determine a set of first candidate content items by the trained model based on the first set of embeddings and the second set of embeddings, determine a prediction value for each respective first candidate content item of the set of first candidate content items by the trained model based on the first set of embeddings and the second set of embeddings, and output one or more first content items of the set of first candidate content items based on the prediction value determined for each respective first candidate content item, training the first model based on applying the first set of embeddings and the second set of embeddings includes determine a set of state values representative of the user actions in the first dataset based on the first set of embeddings and the second set of embeddings, determine an action value for each respective state value of the set of state values by applying one or more algorithms to the set of state values, determine reward scores based on the action value determined for each respective state value of the set of state values, and update one or more weights at an output layer based on the reward scores and the action value determined for each respective state value.

In some embodiments, the instructions executable by the processor further includes train a second model from scratch based on applying the first set of embeddings and the second set of embeddings, and evaluate a performance between the first model and the second model according to one or more metrics. In some embodiments, the trained model includes one of the first model and the second model determined for outputting based on the evaluation.

In some embodiments, evaluating the performance between the first model and the second model includes evaluate the performance between the first model, the second model, and the previous model according to the one or more metrics. In some embodiments, the trained model includes one of the first model, the second model, and the previous model determined for outputting based on the evaluation.

In some embodiments, the instructions executable by the processor further includes obtain a third dataset corresponding to randomized data based on user actions of at least one user of the plurality of users, the randomized data corresponding to a portion of the user actions performed by the plurality of users at the plurality of user devices, and extract a third set of embeddings from the third dataset. In some embodiments, training the first model and the second model includes applying the first set of embeddings, the second set of embeddings, and the third set of embeddings. In some embodiments, the prediction value determined for each respective first candidate content item of the set of first candidate content items by the trained model is based on the first set of embeddings, the second set of embeddings, and the third set of embeddings.

In some embodiments, the randomized data corresponds to about 1% of the user actions performed by the plurality of users at the plurality of user devices.

What is claimed is:

1. A system comprising:
   a processor;
   a non-transitory computer readable media having stored thereon instructions that are executable by the processor to perform operations comprising:
   obtain a first dataset corresponding to user actions of a plurality of users at a plurality of user devices and a second dataset corresponding to historical data for the plurality of users;
   extract a first set of embeddings from the first dataset and extract a second set of embeddings from the second dataset;
   output a trained model based on applying the first set of embeddings and the second set of embeddings;
   determine a set of first candidate content items by the trained model based on the first set of embeddings and the second set of embeddings;
   determine a prediction value for each respective first candidate content item of the set of first candidate content items by the trained model based on the first set of embeddings and the second set of embeddings; and
   output one or more first content items of the set of first candidate content items based on the prediction value determined for each respective first candidate content item.

2. The system of claim 1, wherein the processor further performs operations comprising:
   train a first model based on applying the first set of embeddings and the second set of embeddings, the first model comprising a previous model trained using the first set of embeddings and the second set of embeddings;
   train a second model from scratch based on applying the first set of embeddings and the second set of embeddings; and
   evaluate a performance between the first model and the second model according to one or more metrics;
   wherein the trained model comprises one of the first model and the second model determined for outputting based on the evaluation.

3. The system of claim 2, wherein evaluating the performance between the first model and the second model comprises:
evaluate the performance between the first model, the second model, and the previous model according to the one or more metrics;
wherein the trained model comprises one of the first model, the second model, and the previous model determined for outputting based on the evaluation.

4. The system of claim 2, wherein the user actions of the first dataset correspond to user sequences of the plurality of users in response to content items provided by the previous model.

5. The system of claim 2, wherein the processor further performs operations comprising:
obtain a third dataset corresponding to randomized data based on the user actions of at least one user of the plurality of users;
extract a third set of embeddings from the third dataset; and
wherein training the first model and the second model comprises applying the first set of embeddings, the second set of embeddings, and the third set of embeddings,
wherein the prediction value determined for each respective first candidate content item of the set of first candidate content items by the trained model is based on the first set of embeddings, the second set of embeddings, and the third set of embeddings.

6. The system of claim 5, wherein the randomized data corresponds to a portion of the user actions performed by the plurality of users at the plurality of user devices.

7. The system of claim 5, wherein the randomized data corresponds to about 1% of the user actions performed by the plurality of users in a network of the system.

8. The system of claim 2, wherein the processor further performs operations comprising:
obtain data corresponding to the one or more metrics as inputs from a computing device associated with an entity of the system.

9. The system of claim 2, wherein training the first model based on applying the first set of embeddings and the second set of embeddings comprises:
determine a set of state values representative of the user actions in the first dataset based on the first set of embeddings and the second set of embeddings;
determine an action value for each respective state value of the set of state values by applying one or more algorithms to the set of state values;
determine reward scores based on the action value determined for each respective state value of the set of state values; and
update one or more weights at an output layer based on the reward scores and the action value determined for each respective state value.

10. The system of claim 1, wherein the trained model comprises an off-policy model.

11. The system of claim 1, wherein the first dataset is obtained at a first time period and the second dataset is obtained at a second time period, the second time period occurring before the first time period.

12. A method comprising:
obtaining, by a computing device, a first dataset corresponding to user actions of a plurality of users at a plurality of user devices and a second dataset corresponding to historical data for the plurality of users;
extracting, by the computing device, a first set of embeddings from the first dataset and extract a second set of embeddings from the second dataset;
training a first model based on applying the first set of embeddings and the second set of embeddings, the first model comprising a previous model trained using the first set of embeddings and the second set of embeddings;
training a second model from scratch based on applying the first set of embeddings and the second set of embeddings;
evaluating, by the computing device, a performance between the first model and the second model according to one or more metrics;
outputting, by the computing device, a trained model based on applying the first set of embeddings and the second set of embeddings, the trained model comprising one of the first model and the second model determined for outputting based on the evaluation;
determining a set of first candidate content items by the trained model based on the first set of embeddings and the second set of embeddings;
determining a prediction value for each respective first candidate content item of the set of first candidate content items by the trained model based on the first set of embeddings and the second set of embeddings; and
outputting, by the computing device, one or more first content items of the set of first candidate content items based on the prediction value determined for each respective first candidate content item;
wherein the user actions of the first dataset correspond to user sequences of the plurality of users in response to content items provided by the previous model.

13. The method of claim 12, wherein evaluating the performance between the trained model and the first model comprises:
evaluating, by the computing device, the performance between the trained model, the first model, and the previous model according to the one or more metrics;
wherein the trained model comprises one of the first model, the second model, and the previous model determined for outputting based on the evaluation.

14. The method of claim 12, wherein the method further comprises:
obtaining, by the computing device, a third dataset corresponding to randomized data based on user actions of at least one user of the plurality of users,
wherein the randomized data corresponds to a portion of the user actions performed by the plurality of users at the plurality of user devices; and
extracting, by the computing device, a third set of embeddings from the third dataset;
wherein training the first model and the second model comprises applying the first set of embeddings, the second set of embeddings, and the third set of embeddings, and wherein the prediction value determined for each respective first candidate content item by the trained model is based on the first set of embeddings, the second set of embeddings, and the third set of embeddings.

15. The method of claim 12, wherein the method further comprises:
obtaining, by the computing device, data corresponding to the one or more metrics as inputs from a second computing device associated with an entity.

16. A non-transitory computer readable media having stored therein instructions that are executable by a processor to perform operations comprising:
- obtain a first dataset corresponding to user actions of a plurality of users at a plurality of user devices and a second dataset corresponding to historical data for the plurality of users;
- extract a first set of embeddings from the first dataset and extract a second set of embeddings from the second dataset;
- train a first model based on applying the first set of embeddings and the second set of embeddings, the first model comprising a previous model trained using the first set of embeddings and the second set of embeddings;
- output a trained model based on applying the first set of embeddings and the second set of embeddings, wherein the trained model comprises the first model;
- determine a set of first candidate content items by the trained model based on the first set of embeddings and the second set of embeddings;
- determine a prediction value for each respective first candidate content item of the set of first candidate content items by the trained model based on the first set of embeddings and the second set of embeddings; and
- output one or more first content items of the set of first candidate content items based on the prediction value determined for each respective first candidate content item;
- wherein training the first model based on applying the first set of embeddings and the second set of embeddings comprises:
  - determine a set of state values representative of the user actions in the first dataset based on the first set of embeddings and the second set of embeddings;
  - determine an action value for each respective state value of the set of state values by applying one or more algorithms to the set of state values;
  - determine reward scores based on the action value determined for each respective state value of the set of state values; and
  - update one or more weights at an output layer based on the reward scores and the action value determined for each respective state value.

17. The non-transitory computer readable media of claim 16, wherein the instructions executable by the processor further comprises:
- train a second model from scratch based on applying the first set of embeddings and the second set of embeddings; and
- evaluate a performance between the first model and the second model according to one or more metrics;
- wherein the trained model comprises one of the first model and the second model determined for outputting based on the evaluation.

18. The non-transitory computer readable media of claim 17, wherein evaluating the performance between the first model and the second model comprises:
- evaluate the performance between the first model, the second model, and the previous model according to the one or more metrics;
- wherein the trained model comprises one of the first model, the second model, and the previous model determined for outputting based on the evaluation.

19. The non-transitory computer readable media of claim 17, wherein the instructions executable by the processor further comprises:
- obtain a third dataset corresponding to randomized data based on user actions of at least one user of the plurality of users,
  - wherein the randomized data corresponds to a portion of the user actions performed by the plurality of users at the plurality of user devices; and
- extract a third set of embeddings from the third dataset;
- wherein training the first model and the second model comprises applying the first set of embeddings, the second set of embeddings, and the third set of embeddings, and wherein the prediction value determined for each respective first candidate content item of the set of first candidate content items by the trained model is based on the first set of embeddings, the second set of embeddings, and the third set of embeddings.

20. The non-transitory computer readable media of claim 19, wherein the randomized data corresponds to about 1% of the user actions performed by the plurality of users at the plurality of user devices.

* * * * *